United States Patent
Pelrine et al.

(10) Patent No.: US 9,647,523 B2
(45) Date of Patent: May 9, 2017

(54) LEVITATED-MICRO MANIPULATOR SYSTEM

(71) Applicant: SRI INTERNATIONAL, Menlo Park, CA (US)

(72) Inventors: Ronald E. Pelrine, Longmont, CO (US); Annjoe Wong-Foy, Pacifica, CA (US)

(73) Assignee: SRI INTERNATIONAL, Menlo Park, CA (US)

( * ) Notice: Subject to any disclaimer, the term of this patent is extended or adjusted under 35 U.S.C. 154(b) by 374 days.

(21) Appl. No.: 14/196,720

(22) Filed: Mar. 4, 2014

(65) Prior Publication Data

US 2014/0183979 A1    Jul. 3, 2014

Related U.S. Application Data

(63) Continuation-in-part of application No. 13/270,151, filed on Oct. 10, 2011, now Pat. No. 8,686,602, which is a continuation of application No. 12/960,424, filed on Dec. 3, 2010, now Pat. No. 8,593,016.

(51) Int. Cl.
*H02K 41/02* (2006.01)
*H02K 41/03* (2006.01)

(52) U.S. Cl.
CPC ......... *H02K 41/03* (2013.01); *H02K 2201/18* (2013.01)

(58) Field of Classification Search
CPC ..... H02K 2201/18; H02K 41/02; H02K 41/03
USPC ................. 310/12.05, 12.21; 141/1; 414/800
See application file for complete search history.

(56) References Cited

U.S. PATENT DOCUMENTS

| | | |
|---|---|---|
| 3,597,022 A | 8/1971 | Waldron |
| 4,835,424 A | 5/1989 | Hoffman et al. |
| 5,015,622 A | 5/1991 | Ward et al. |
| 5,298,875 A | 3/1994 | Laibowitz et al. |
| 5,396,136 A | 3/1995 | Pelrine |
| 5,783,915 A * | 7/1998 | Shida ................. H02K 41/0356 310/12.19 |
| 5,795,457 A | 8/1998 | Pethig et al. |
| 5,925,956 A | 7/1999 | Ohzeki |
| 5,955,800 A | 9/1999 | Shearwood et al. |
| 6,064,170 A | 5/2000 | Spurr et al. |
| 6,075,924 A | 6/2000 | Will |
| 6,097,114 A | 8/2000 | Hazelton |

(Continued)

FOREIGN PATENT DOCUMENTS

WO    01/68256 A3    9/2001

OTHER PUBLICATIONS

European Search Report, dated Oct. 16, 2015, European Patent Application No. 11844154.2, 6 pages.

(Continued)

*Primary Examiner* — Alex W Mok
(74) *Attorney, Agent, or Firm* — Marger Johnson

(57) ABSTRACT

A system has a first operation substrate, the operation substrate having at least one sliding surface and at least one conductive trace in a layer in the substrate, at least one flex circuit magnetically coupled to the operation substrate, the flex circuit having at least one sliding surface and at least one conductive trace in the substrate, and at least one manipulator moveable across the sliding surfaces of the operation substrate and the flex circuit by magnetic fields generated by application of current to the conductive traces.

19 Claims, 25 Drawing Sheets

(56) References Cited

U.S. PATENT DOCUMENTS

| | | | | |
|---|---|---|---|---|
| 6,175,169 B1* | 1/2001 | Hollis, Jr. | ............. | H02K 41/03 |
| | | | | 310/12.05 |
| 6,293,006 B1* | 9/2001 | Takeda | ............... | H05K 13/0408 |
| | | | | 29/707 |
| 6,520,315 B1 | 2/2003 | Sugarman et al. | | |
| 6,858,184 B2 | 2/2005 | Pelrine et al. | | |
| 7,084,532 B2 | 8/2006 | Widdowson et al. | | |
| 7,084,533 B2 | 8/2006 | Botos et al. | | |
| 7,126,134 B2 | 10/2006 | Lean et al. | | |
| 7,189,359 B2 | 3/2007 | Yuan et al. | | |
| 7,206,671 B2* | 4/2007 | Mizuno | .................. | H01L 24/81 |
| | | | | 29/739 |
| 7,847,824 B2* | 12/2010 | Mogamiya | ........... | H04N 5/2253 |
| | | | | 310/12.05 |
| 8,164,232 B2 | 4/2012 | Kornbluh et al. | | |
| 2002/0020836 A1* | 2/2002 | Kikuchi | ................. | H01L 28/55 |
| | | | | 257/1 |
| 2002/0106314 A1 | 8/2002 | Pelrine et al. | | |
| 2003/0155821 A1 | 8/2003 | Frissen et al. | | |
| 2005/0194841 A1 | 9/2005 | Widdowson et al. | | |
| 2006/0078407 A1 | 4/2006 | del Puerto et al. | | |
| 2006/0175910 A1 | 8/2006 | Asano et al. | | |
| 2006/0186741 A1* | 8/2006 | Kasahara | ............ | G03F 7/70758 |
| | | | | 310/12.05 |
| 2007/0111117 A1 | 5/2007 | Noh et al. | | |
| 2010/0026443 A1 | 2/2010 | Yan et al. | | |

OTHER PUBLICATIONS

International Search Report dated Apr. 3, 2012 in corresponding International Application No. PCT/US11/62732.

* cited by examiner

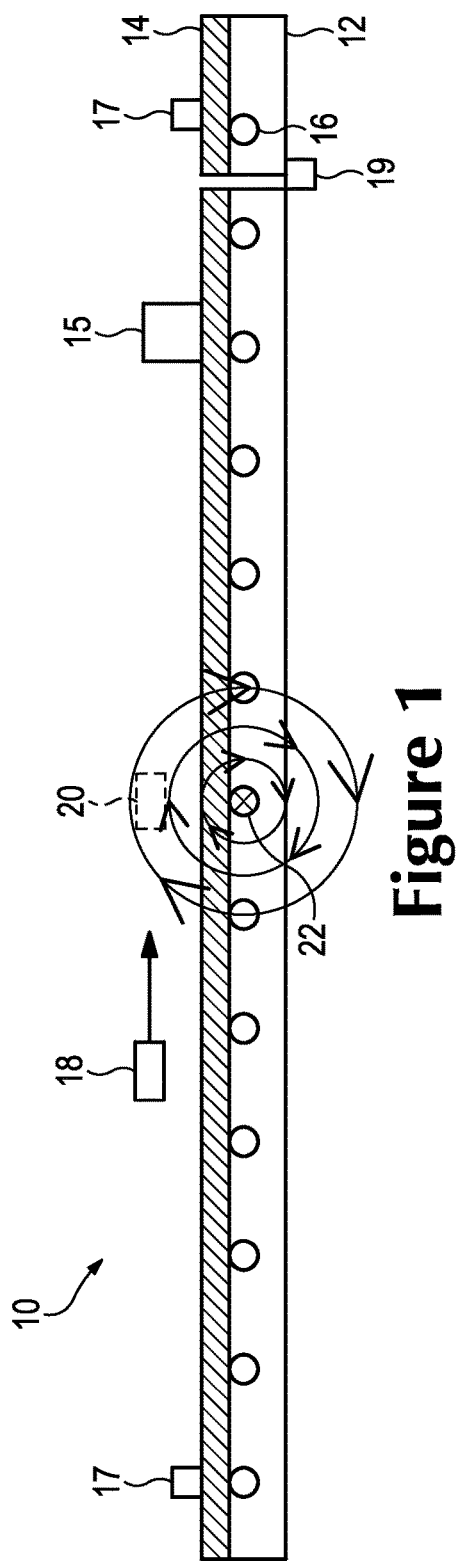
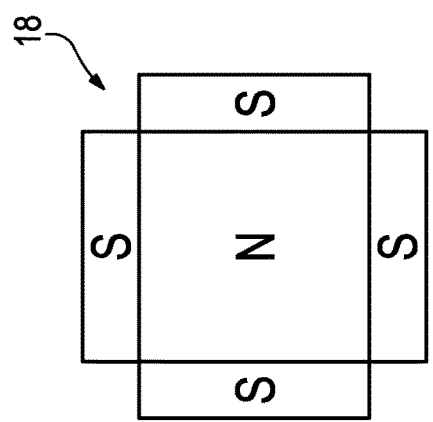

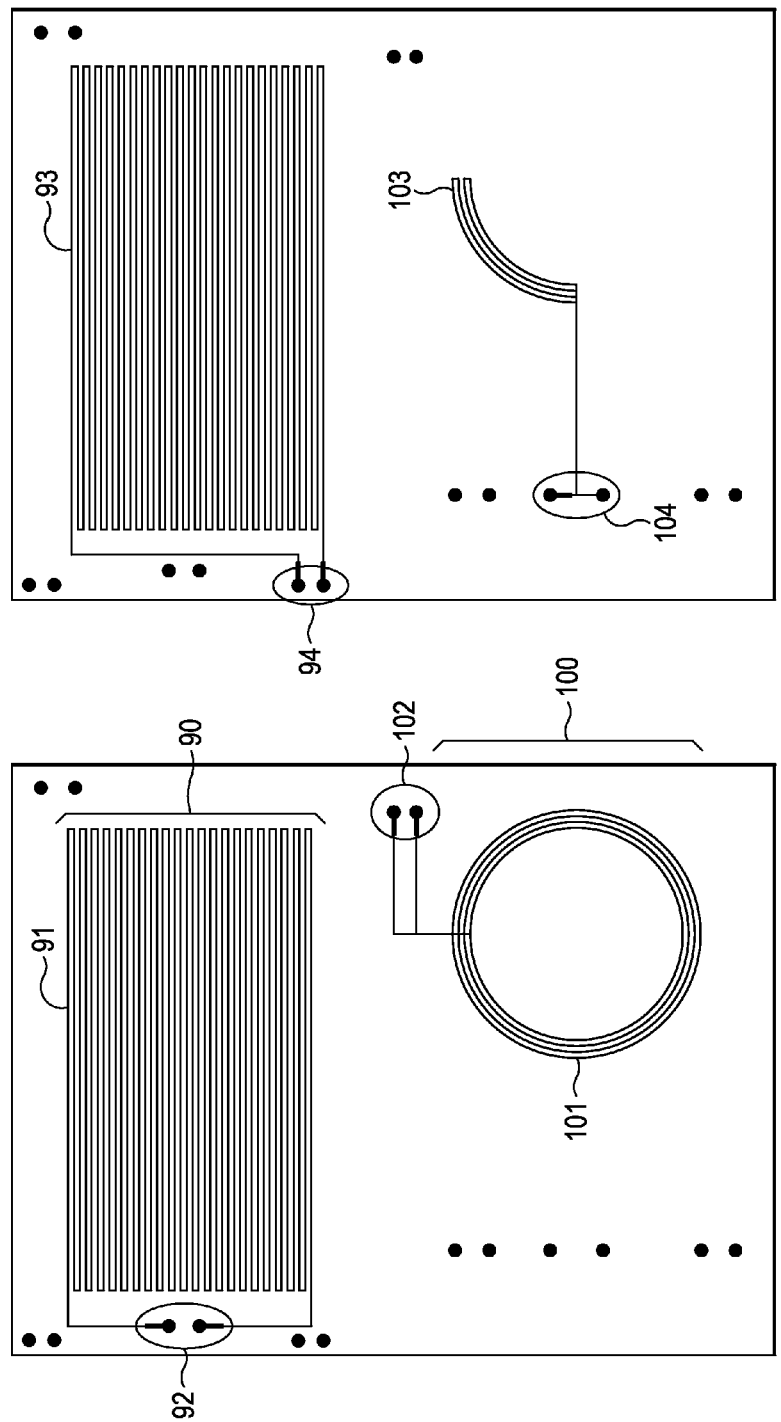

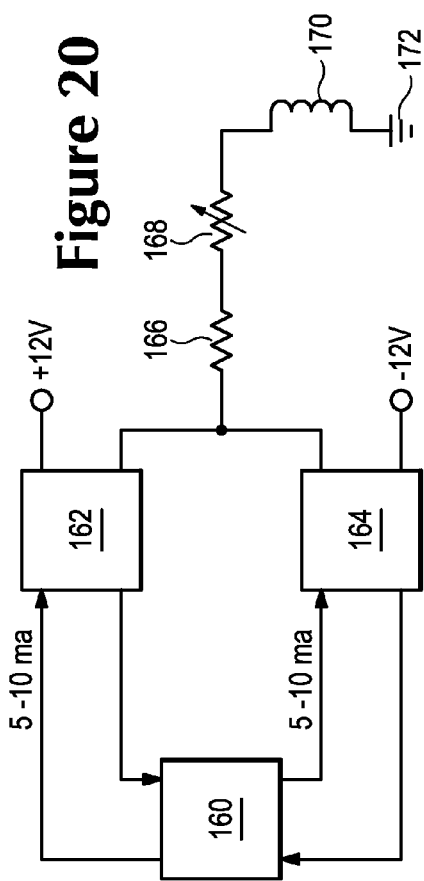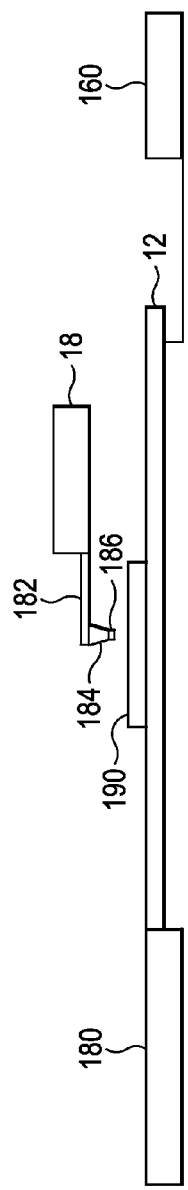

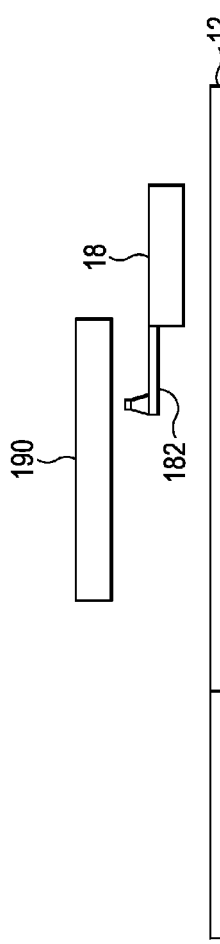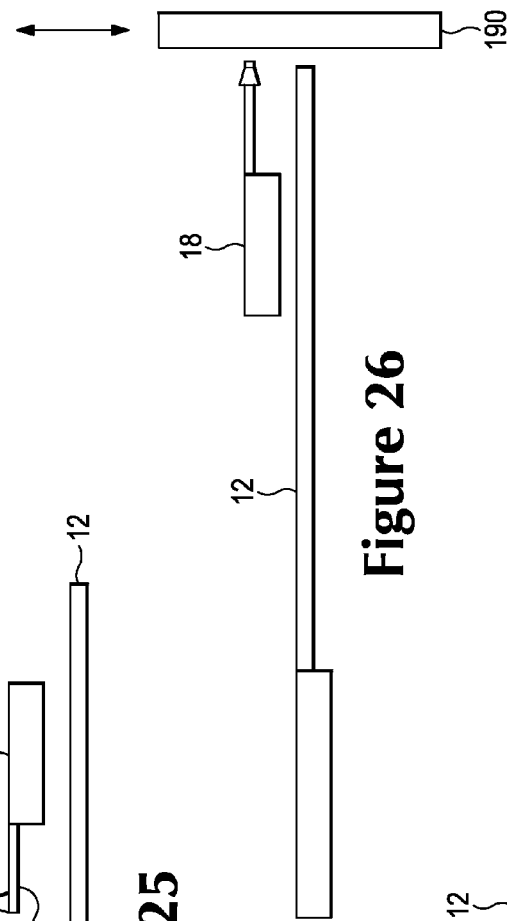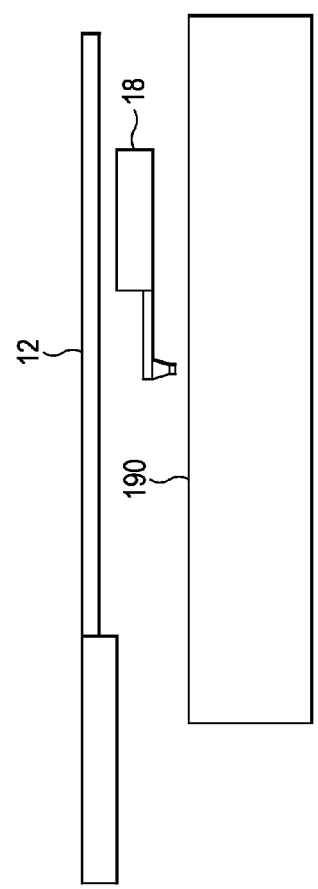

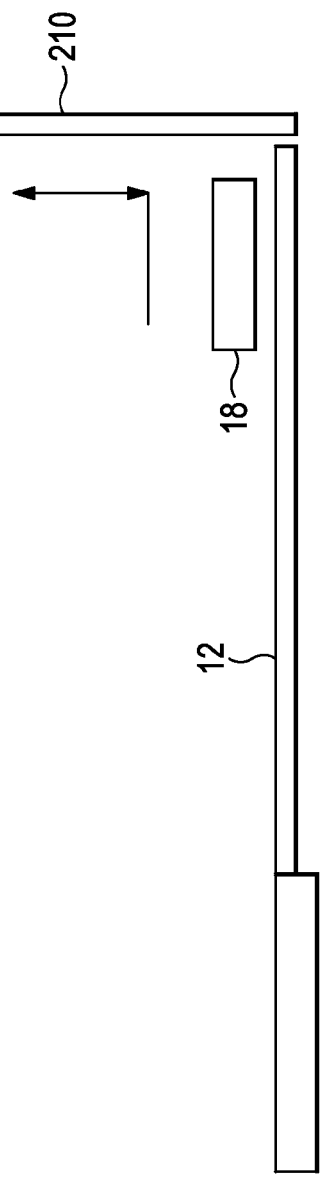
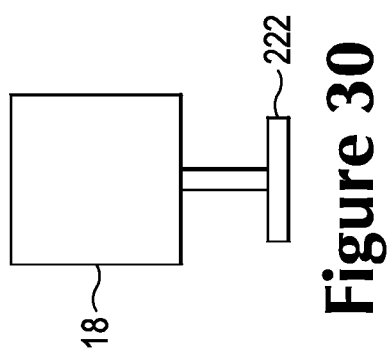
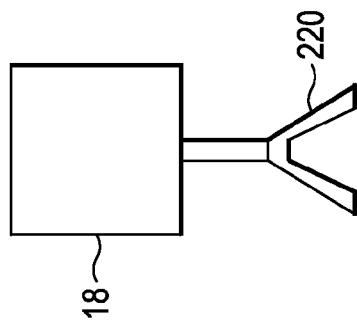
Figure 28
Figure 30
Figure 29

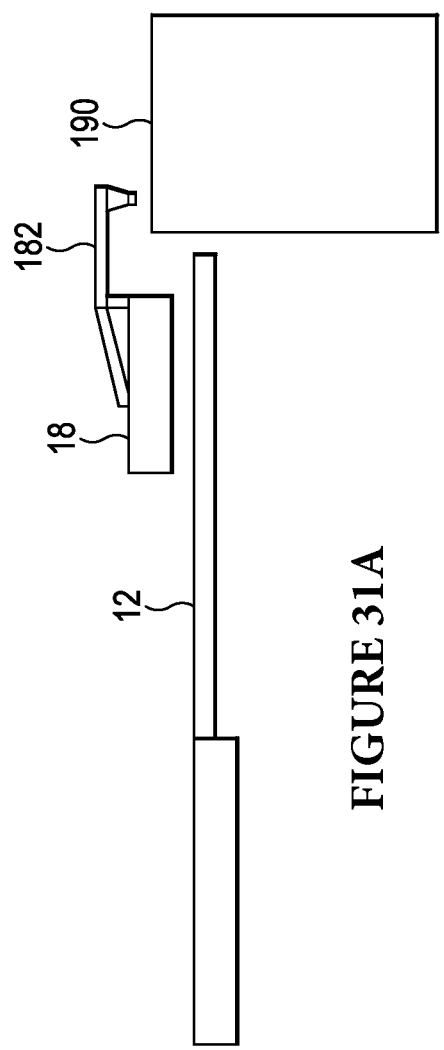
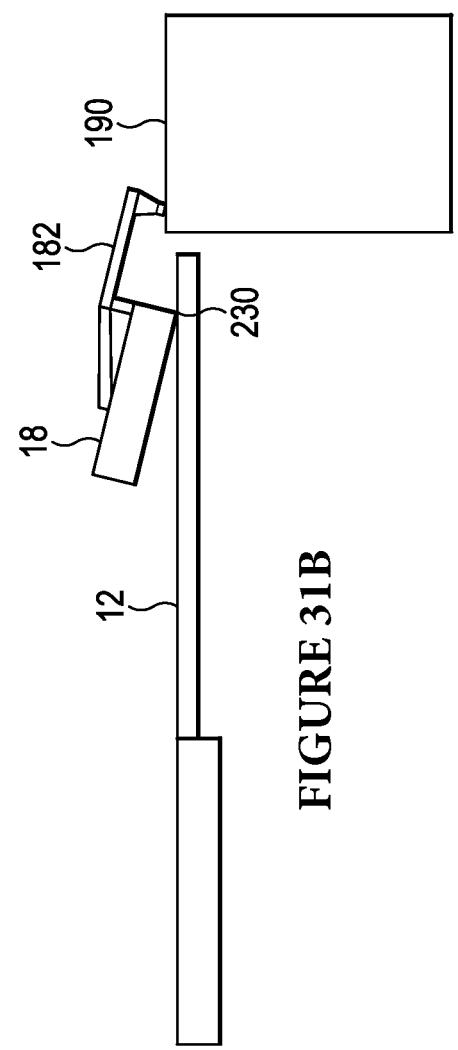

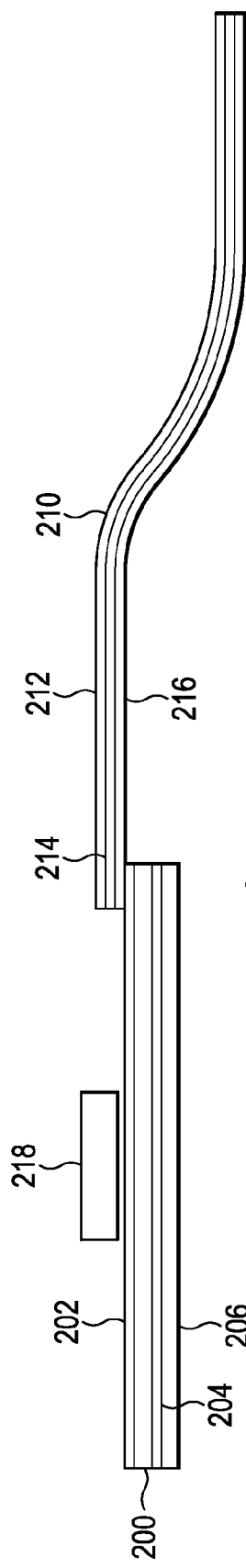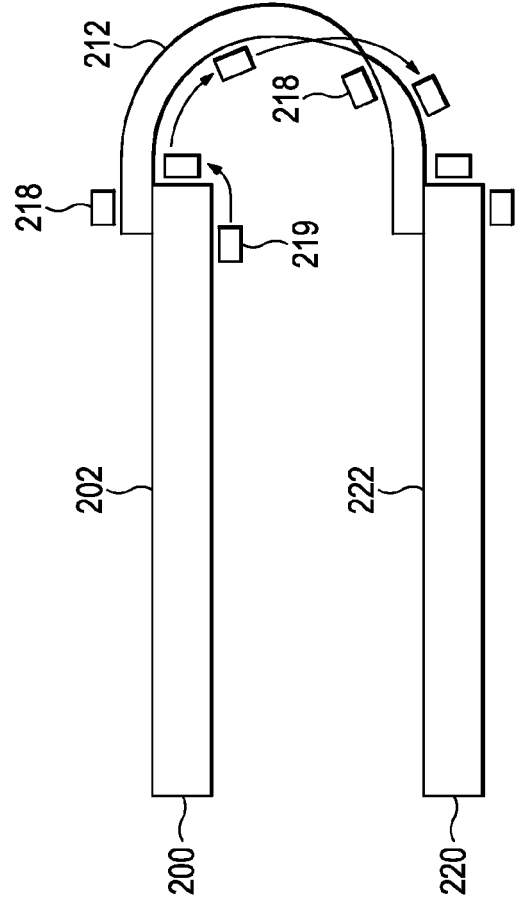
Figure 34
Figure 35

LEVITATED-MICRO MANIPULATOR SYSTEM

RELATED APPLICATIONS

This application is a continuation-in-part of U.S. patent application Ser. No. 13/270,151, filed Oct. 10, 2011, which is a continuation of U.S. patent application Ser. No. 12/960,424 filed Dec. 3, 2010, now issued as U.S. Pat. No. 8,593,016.

GOVERNMENT FUNDING

This invention was made with Government support under Contract Number HR0011-12-C-0040 awarded by the Defense Advanced Research Projects Agency. The Government has certain rights in this invention.

BACKGROUND

Magnet levitation has many possible applications. U.S. Pat. No. 5,099,216, "Magnetically Levitated Apparatus," to Pelrine, discusses magnetically levitated robotic manipulators. The manipulators have attached magnetically active components, such as permanent magnets, upon which magnetic forces are imposed by fields generated by electromagnets. The discussion also addresses stability and damping of the motion of the robotic manipulators, where the manipulators can move with six degrees of freedom.

U.S. Pat. No. 5,396,136, "Magnetic Field Levitation," to Pelrine, discusses the use of a magnetic member having an array of magnets and a diamagnetic or other material having magnetic permeability of less than one. The diamagnetic material acts as a base defining an area over which the magnetic member can levitate and be moved by external magnetic forces.

These approaches generally rely upon an array of electromagnets to provide the magnetic fields to act upon the magnetic robots. The arrays of electromagnets determine the regions upon which the robots can be controlled by the fields generated by the electromagnets. While these arrays provide reasonably precise control of the robots, they still require electromagnets to provide the external forces that act on the robots. Another approach, discussed in U.S. Pat. No. 6,858,184, "Microlaboratory Devices and Methods," uses a substrate having within it biasing elements in conjunction with an array of drive elements above the substrate. The drive elements move the magnetic elements in the space between the drive elements and the substrate.

BRIEF DESCRIPTION OF THE DRAWINGS

FIG. 1 shows a side view of a magnetic levitated manipulator system.

FIG. 2 shows an embodiment of a manipulator having a magnet array.

FIGS. 15A-D show a circuit substrate having control patterns.

FIG. 20 shows a drive circuit for a trace in a levitated manipulator system.

FIGS. 21-28 show embodiments of microfactory system configurations.

FIGS. 29 and 30 show embodiments of end effectors.

FIGS. 31A and 31B show an embodiment of an end effector suitable for gravity-assisted tilting.

FIG. 34 shows an embodiment of a system having an operation substrate and a flex circuit.

FIG. 35 shows an embodiment of a system having a flex circuit with a twist about more than one axis.

DETAILED DESCRIPTION OF THE EMBODIMENTS

Figure 3:
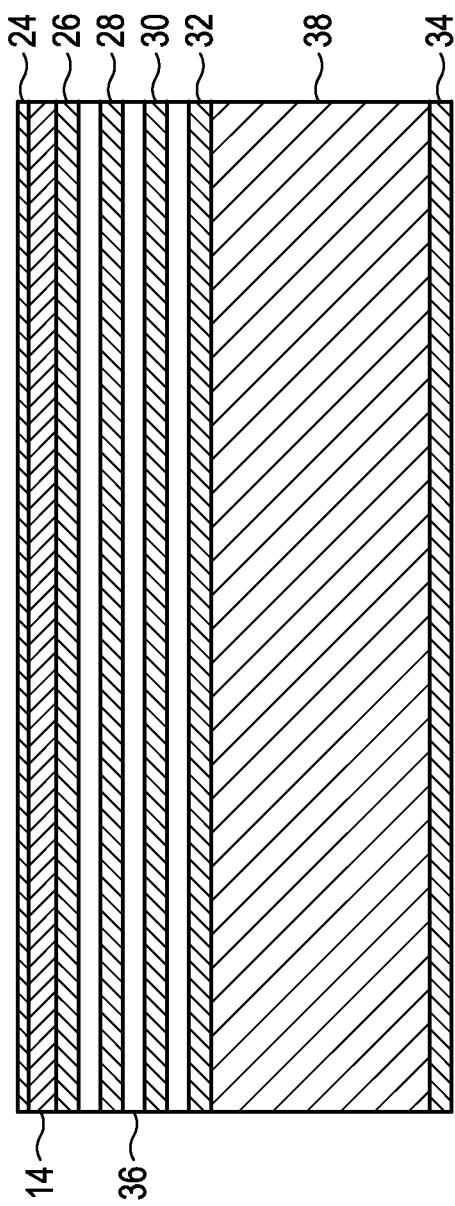
FIG. 3 shows a side view of a magnetic levitated manipulator system circuit substrate.

FIG. 1 shows a side view of an embodiment of a levitated manipulator system 10. The system has a circuit substrate 12 in which reside circuit traces 16 and 22 to carry current. In this example, circuit trace 22 carries current or is energized. The current travels in trace 22 flowing into the page. The resulting magnetic field acts upon the magnet 18, also referred to as a manipulator. The manipulator 18 will move to position 20 to align the magnetic dipole moment or magnetization of the manipulator to the field generated by the energized trace 22. In FIG. 2, magnet 18 has a magnetization horizontal and to the right. The magnetization may also be in different directions, such as vertically up or down, in which case it will still respond to energized trace 22 but settle to a different equilibrium location relative to energized trace 22 (to align with the vertical field from trace 22 rather than the horizontal field). The circuit substrate 12 may include mechanical stops such as 15 that allow the magnets to be mechanically stopped at desired positions, which may simplify control. The circuit substrate 12 may also include sensors such as 17 that sense the positions of the manipulators using inductive feedback, optical sensing, etc. For example, the optical sensing could be accomplished by optical sensors in the layers of the substrate with a hole allowing light to reach the sensor as shown by sensor 19. When a magnet or part of the manipulator structure crosses over the hole, causing a break in the light, the optical sensor would respond.

A diamagnetic layer 14 defines the region over which the manipulator will levitate, producing a lift force that levitates the manipulator 18. By controlling the current in the various traces in the circuit substrate 12, one can cause the manipulator to move and perform tasks. By combining manipulators, the circuit substrate, and a controller to control the application of current, one can coordinate the movements of manipulators to perform useful tasks. A wide variety of physical tasks are possible, including transport of materials, both solid and liquid, assembly of materials through application of adhesive and other processes, sorting of materials, quality control assessments of material properties. These and other similar independent tasks are referred to as unit operations.

Further, higher levels of coordination and control at a system level are possible that will result in the fabrication of complex components, or some other useful industrial process. This coordination is similar to full scale factory automation, possible at a micro scale through the embodiments discussed here. This full system of coordinated manipulators as a microfactory of levitated manipulators, or a levitated microfactory. An example of a levitated microfactory will be discussed later with reference to FIG. 16.

The manipulators will generally consist of one or more magnets arranged together. In one embodiment the manipulators consist of a central magnet and four outer magnets. The poles and arrangement of these magnets may achieve many effects. For example, the manipulators may be configured to repel other manipulators in a same plane of motion, such as a central magnet with canceling poles on the outer sides configured to cause the magnetic moment of the manipulator to be zero and to repel other similarly configured manipulators. Alternatively or in addition to the above, the manipulators may have a zero net magnetic dipole moment to reduce the interaction with larger scale external magnetic fields such as the earth's magnetic field. When levitated, the manipulators can move with six degrees of freedom, three translational along the x, y and z axes, and three rotational in pitch, yaw and roll.

In one embodiment shown in FIG. 2, the manipulator may consist of an array of magnets. In the embodiment of FIG. 2, the center magnet with a north pole is 1×1 mm, and the south pole cancelling magnets are 1×0.25 mm. In one embodiment, the 1×1 mm and 1×0.25 mm magnets are 0.4 mm thick. These magnets may be grade 50 neodymium-iron magnets bonded together such as with epoxy. This particular configuration serves merely as an example. In an alternative configuration, for example, the center magnet may again be 1×1 mm, with the 4 canceling magnets being 0.75×0.33 mm. In one embodiment, the 1×1 mm and the four 0.75×0.33 mm magnets are 0.4 mm thick. Many kinds of arrays can be made and used, such as a checkerboard geometry having no net magnetic moment. A nine magnet checkerboard array has a net magnetic moment and will repel a similarly oriented nine magnet array. Magnetic shielding may also minimize manipulator-manipulator magnetic interactions to allow close packing of manipulators.

Magnet arrays can also be connected such as using rigid lightweight materials such as rods and wires with adhesives. The magnetic behavior of the connected manipulators depends on the nature of the connection (rigid or compliant) and the position of one array relative to the other. In one embodiment, for example, a first array using the magnetic configuration shown in FIG. 2 is rigidly connected using 0.3 mm graphite rods with cyanoacrylate adhesive to a second identical array so that the bottom of the two arrays are parallel. Both arrays are oriented the same way with this embodiment, and the offset distance of the rigid connection is chosen so that both arrays experience identical magnetic forces from repeating trace patterns such as those described below.

The manipulators move by reacting to the magnetic fields generated by current in the traces on the circuit substrate. The circuit substrate may consist of one of many alternatives, including a printed circuit board, a ceramic substrate, a semiconductor wafer, etc. No limitation is intended and none should be implied to any particular configuration or material for the circuit substrate. FIG. 3 shows an embodiment of such a substrate. In this embodiment, the circuit substrate 12 has four layers of conductive traces, typically copper, 32, 30, 28 and 26, separated by insulating layers such as 36. The insulating layers 36 will typically have minimal thickness, and the entire region of layers from 32 through 26 will have minimal thickness as well. The lower layers will generally have lower gain, where gain is defined as the magnetic field gradient at the top surface of conductive layer 24 per unit of current. Permanent magnets, and therefore the manipulators, are moved by the magnetic field gradients. The lower gain of the lower traces may be compensated by raising the current in those traces as desired.

In one embodiment for example, the insulating layers 36 are 0.002" thick and the conductive layers 32, 30, 28, and 26 use copper that is 0.0028" thick (sometimes referred to as 2 oz copper in the printed circuit board industry). In this embodiment, the trace widths are typically 0.010" wide and the currents are 0.25 A, 0.33 A, 0.48 A, and 0.70 A for layers 26, 28, 30, and 32, respectively. As described below, negative currents of similar magnitude can be used for quadrature drive to move the robot. Other values of current can, of course, be used, and higher currents can be used to generate higher forces while lower currents reduce heating and make the robot more likely to levitate above rather than slide along the surface.

Between the bottom circuit layer 32 and the connection layer 34, a larger insulating layer 38 resides. In one experiment, the inner insulation layer 38 had a thickness of 1 millimeter or greater. The connection layer 34 connects to the conductive trace layers by way of vias through the inner insulation layer 38 as well as between traces and the insulating layers in the upper region of the substrate. In one embodiment, the via connections were routed to the edge of the board.

The diamagnetic layer 14 resides on a first surface of the circuit substrate 12. As discussed above, the diamagnetic layer provides the lifting force that levitates the manipulators. In order to provide more precise control over the fields that cause the manipulators to move, a conductive layer 24 may reside over the diamagnetic layer to provide eddy current damping. Unlike the inner conductive layers which have patterns of traces, the current damping layer will typically have complete coverage of the diamagnetic layer. The thicknesses of diamagnetic layer 14 and conductive layer 24 depends on the size of the manipulators and magnets, with larger manipulators and magnets generally requiring thicker layers.

In one embodiment using the magnetic array shown in FIG. 2 with a 1×1×0.4 mm central magnet and 0.75×0.33× 0.4 outer magnets, the diamagnetic layer 14 is made using a sheet of polished pyrolytic graphite 0.5 mm thick, and the conductive layer is polished copper approximately 0.012 mm thick. In some embodiments the manipulators do not fully levitate above the diamagnetic and conductive layers but rather slide on the surface. In other embodiments using sliding motion, the diamagnetic layer can even be eliminated. However, even when the manipulator is not levitated, a diamagnetic layer 14 exerts a diamagnetic force pushing the manipulator away from the surface, thereby reducing the effective friction by reducing the normal forces even in the case of sliding motion. In one embodiment, a second very thin layer (0.025 mm thick) of diamagnetic graphite (not shown) is on top of the conductive layer 24 to further reduce friction.

Although FIGS. 1 and 3 show a relatively flat circuit substrate 12, it will be understood that circuit substrate 12 can curved concave, convex, or in other complex shapes using circuit fabrication means known in the prior art. For example, circuit substrate 12 may be made using flex circuit fabrication processes known in the prior art, or it may be made directly on a curved object using processes such as inkjet-printed circuits. In some cases insulation layer 38 can be made very thin or eliminated entirely to enhance mechanical flexibility of the circuit. Connection layer 34 can also be eliminated in some embodiments by making connections off to the side of the magnetically active regions using vias and contact pads known in the prior art.

Figure 4:
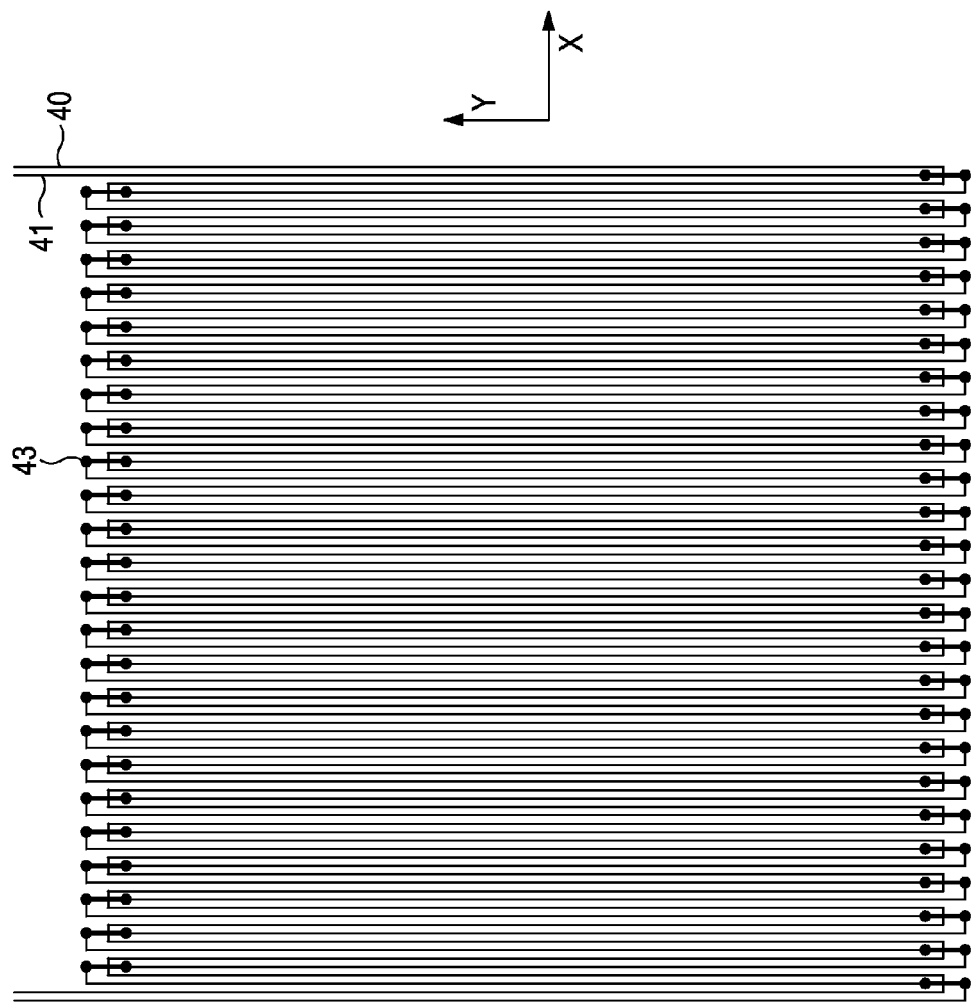
FIGS. 4-6 show an embodiment of trace patterns used to generate magnetic fields.
Figure 5:
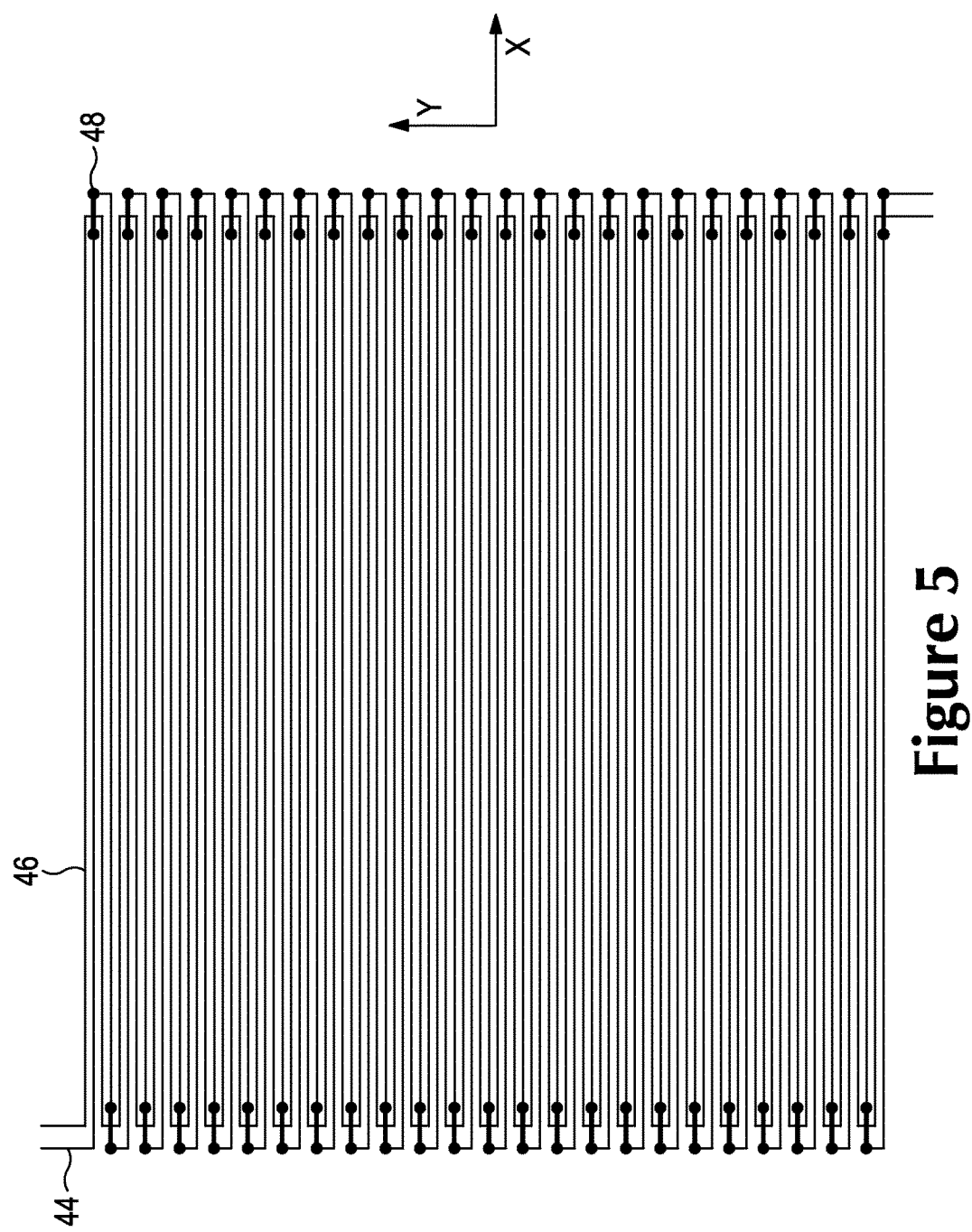
Figure 6:
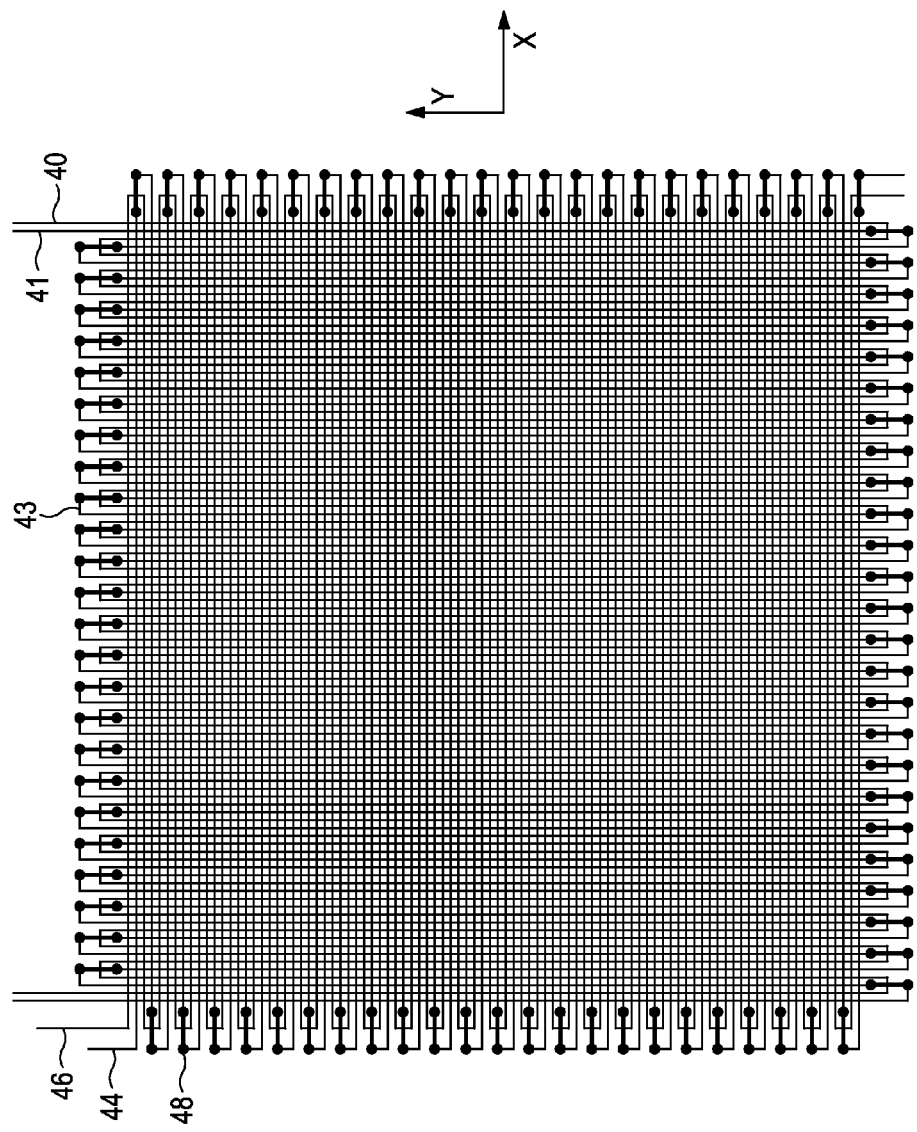

In order to control the manipulator using the control zones over which the manipulators move, each layer of the circuit substrate has a pattern of repeating traces which may be connected together by vias or directly connected. FIGS. 4-6 show an embodiment of an arrangement of the vias. In one embodiment, layer 26 from FIG. 3, the first conductive layer, has two parallel line patterns 40 and 41 offset one half the distance of the trace-to-trace distance in each pattern shown in FIG. 4. For example, a first parallel line pattern may have 1 mm spacing between traces in the pattern, with a second parallel line pattern being offset 0.5 mm from the first pattern. While the patterns have connections at the ends of the lines to the next line or lines in the pattern, the majority of the trace lengths in this pattern consists of parallel lines.

Vias such as 43 are used to cross over into the second layer 28 from FIG. 3 at points where the two patterns would otherwise touch in layer 26. These vias form a sort of 'underpass' to allow the traces 41 to remain in their patterns but avoid contact with traces 40. The traces in FIG. 4 may be called x traces because they would typically be used to move the manipulator in the x or horizontal direction shown in the figure.

FIG. 5 shows a similar pattern for the y, or vertical direction of motion as drawn, traces. The second conductive layer 28 from FIG. 3 has two parallel line patterns 44 and 46 offset from each other one half of the distance between traces. Vias such as 48 provide connection to the first conductive layer 26 to provide crossover connections, using layer 1, for parallel line pattern 44. FIG. 6 shows the combined via patterns of the first and second layers. While the term 'pixel' typically means 'picture element,' or the smallest portion of an image, these combined patterns will be referred to as pixels. They are generally laid out in a pixilated pattern, very similar to those of display elements. A pixel can drive a single manipulator, or, if it is large enough, can drive many manipulators in parallel where all the manipulators on the pixel would move simultaneously in unison.

Figure 7:
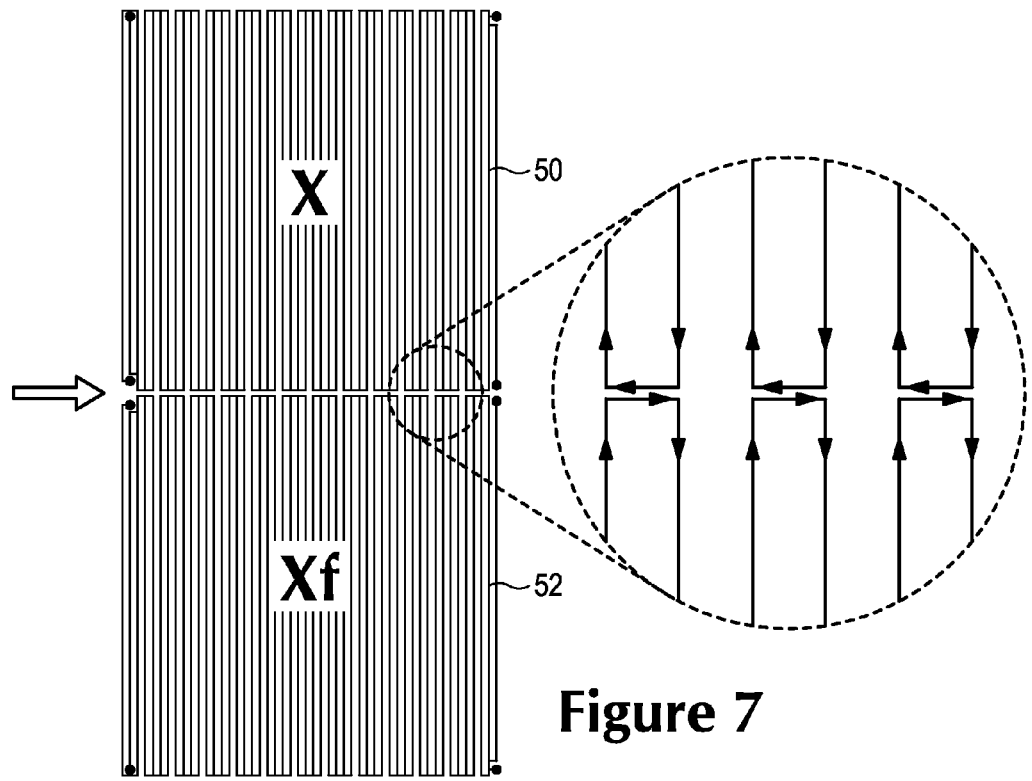
FIGS. 7 and 8 show an alternative embodiment of trace patterns used to generate magnetic fields.
Figure 8:
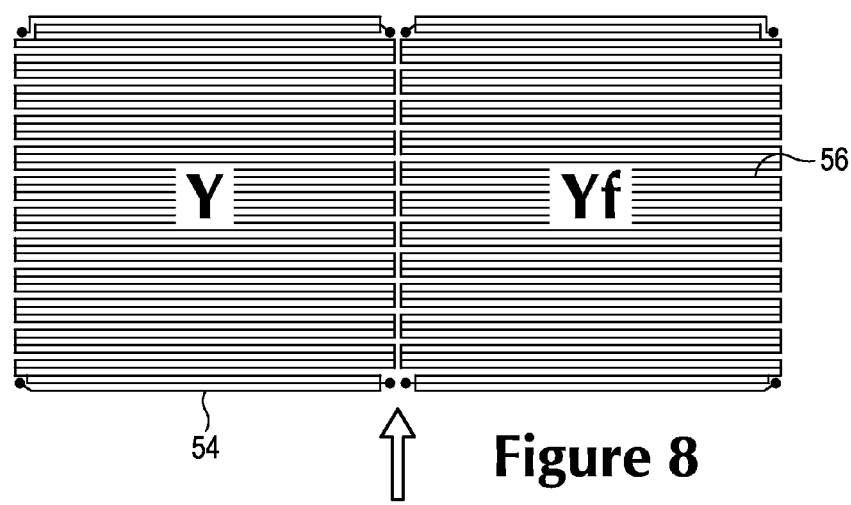

FIGS. 7-8 show an alternative embodiment of the trace patterns used to generate magnetic fields. FIG. 7 shows an X pixel 50 that uses a similar offset pattern as the pixels shown in FIGS. 4-6. However, in this instance the two offset patterns used for the X pixel 50 are in separate layers. This eliminates the cross-over vias, but requires more layers, since the Y pixel will also require two layers for its offset patterns, resulting in use of four conductive layers.

Because of a need to cancel some fields at pixel boundaries, one may require 'flipped' versions of the X and Y patterns. For example, FIG. 7 shows a combination of an X pixel 50, similar to FIG. 4, and the vertically flipped version Xf, 52. Note that at the boundary between these pixels 50 and 52, the traces of the two pixels come in close proximity to each other as the parallel line pattern for each must turn horizontally a short segment to make the next vertical trace. These short horizontal segments can interfere with vertical motion if they create an unwanted magnetic field. However, by making the horizontal segments for pixel 50 line up in close proximity with the horizontal segments from pixel 52 but with opposite currents, the unwanted magnetic fields from horizontal segments in an X direction pattern are effectively canceled between the two pixels. In the exploded portion of the diagram, the arrows indicate the directions of the current in the different traces, with only the top layer of traces shown. As seen here, the current in the vertical traces align, and the current in the horizontal traces travel in opposite directions, resulting in cancellation between them.

Similarly, the Y pixel 54, similar to that of FIG. 5 has a flipped version Yf 56. These variations, of X+Y, X+Yf, Xf+Y and Xf+Yf combine to form a unit which can be thought of as an aggregate pixel that can move the manipulator in both x and y directions. Vias can be used to connect through the circuit substrate for external connections on connection layer 34 in FIG. 3. This unit can be tiled throughout the circuit substrate as needed to control the manipulators. The external connections on the bottom connection layer 34, by suitable connections to a current source, can provide electrical current to drive the traces in the pixels. The external connections can also be jumpered to connect pixels in series or parallel, to provide groups of pixels with common control. The currents through their respective traces are then identical, or, if desired, reversed polarity depending on the connection.

Figure 9:
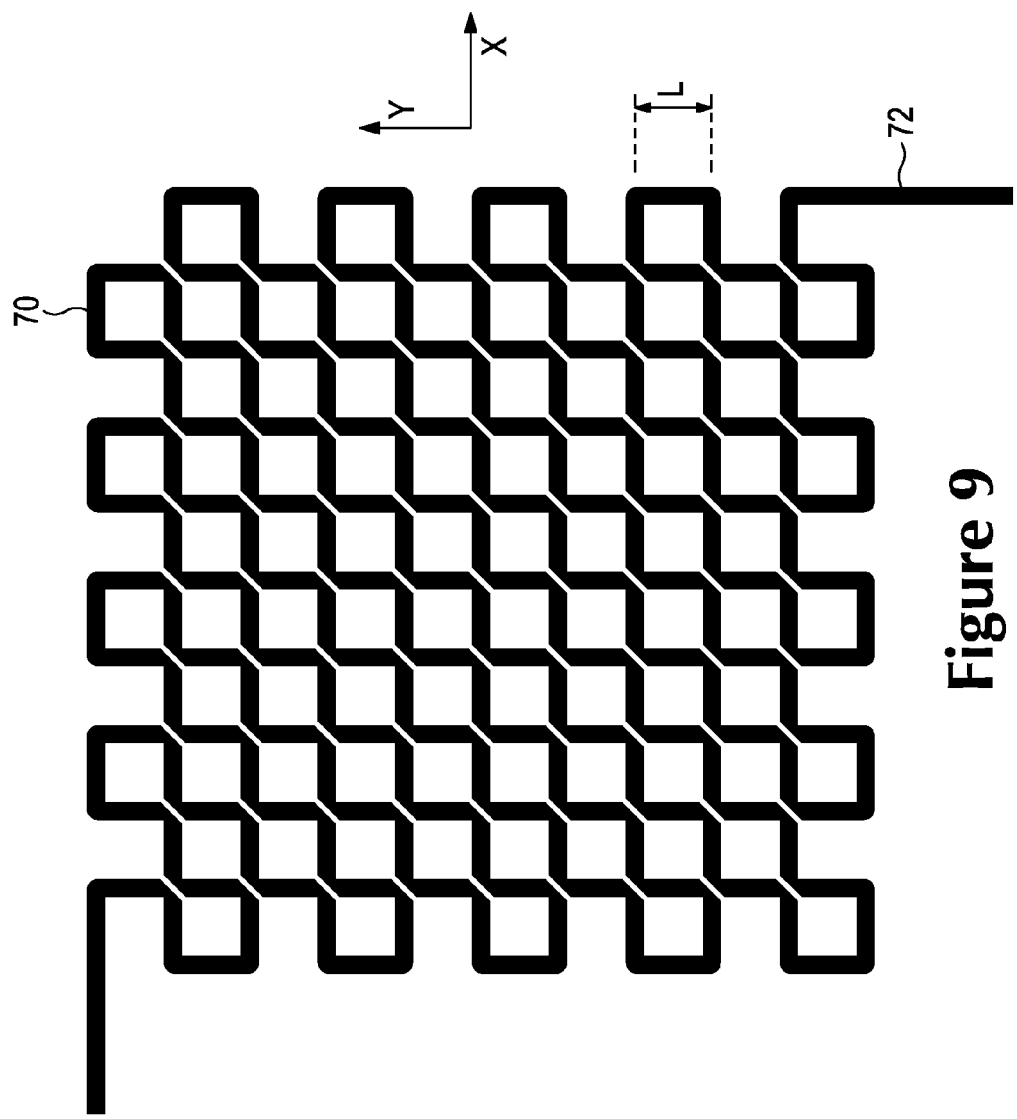
FIGS. 9-12 show alternative embodiments of trace patterns used to generate magnetic fields.

FIGS. 9-12 show another alternative embodiment of trace patterns. FIG. 9 shows an example of a symmetric zig-zag line pattern 70 formed in the first conductive layer for the drive traces. The zig-zag line pattern, formed from zigzag traces, is symmetric in that the height and width, L, of the local squares within the pattern are equal. The corners of the local squares may need to be angled to provide the necessary clearance to the other squares in the pattern. The first layer has connectors, such as 72. The same zig-zag line pattern is used, only offset, for layers 2 and 3.

Figure 10:
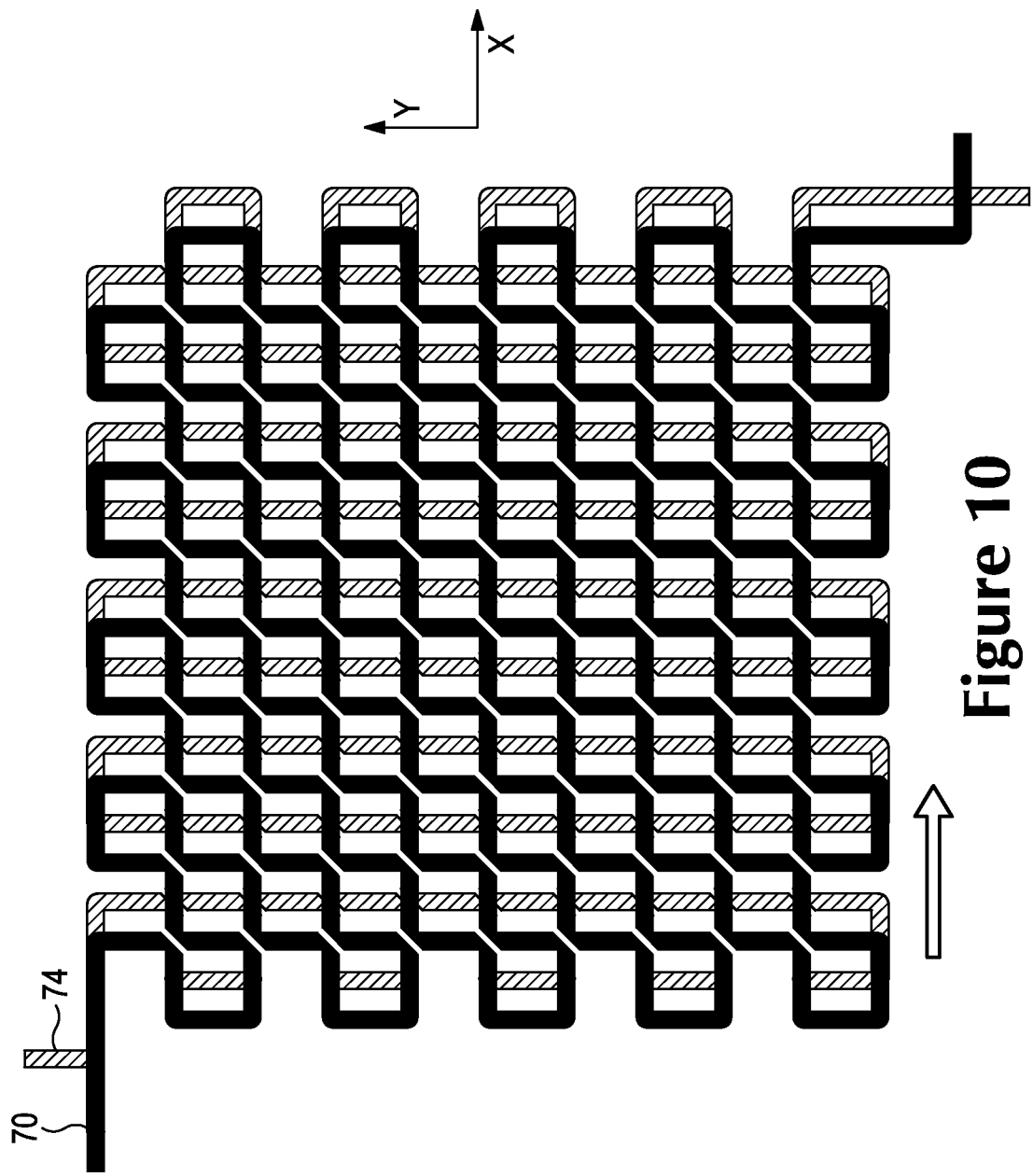
Figure 11:
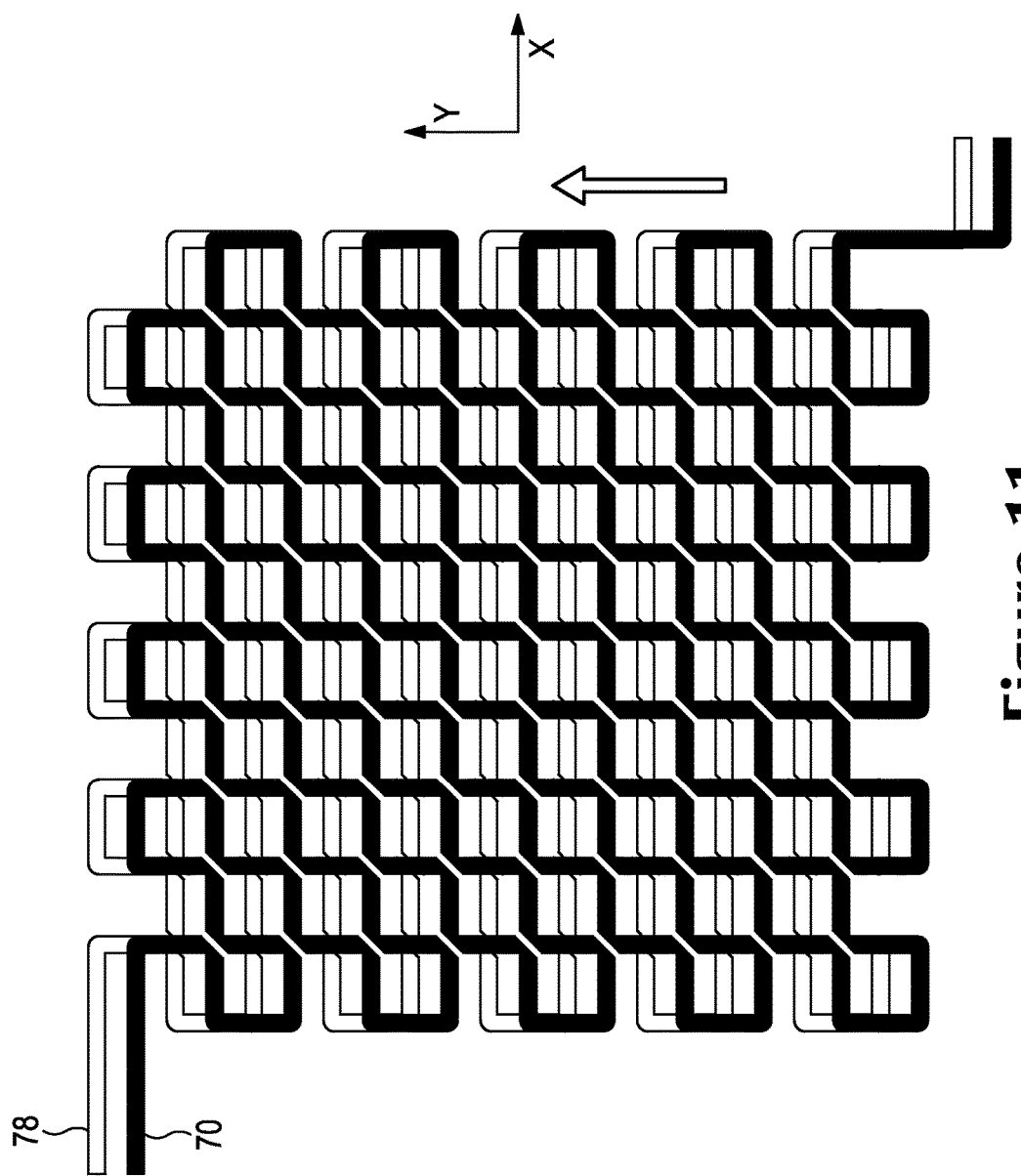

For example, in FIG. 10, the zig-zag line pattern 70 of FIG. 9 has been repeated on trace layer 26 (see FIG. 3). The pattern 74 in FIG. 10, located on trace layer 28 (see FIG. 3), has been offset one half the square length L (see FIG. 9) horizontally relative to zig-zag line pattern 70. In the zigzag pattern shown in these diagrams, the manipulator will move in whichever direction the traces are offset. The traces actually run in a zigzag pattern at 45 degrees relative to the x and y directions shown in FIG. 10. In the parallel line patterns of the previous FIGS. 4 to 8, the manipulator will move perpendicular to the sequentially actuated traces as described below. By contrast, the pattern 74 of FIG. 10, acting in conjunction with pattern 70, will cause the manipulator to move in the X direction shown by the axis. FIG. 11 shows that the zigzag pattern has been offset vertically as well, as pattern 78. Pattern 78, acting in conjunction with pattern 70, will cause the manipulator to move in the Y direction shown by the axis.

Figure 12:
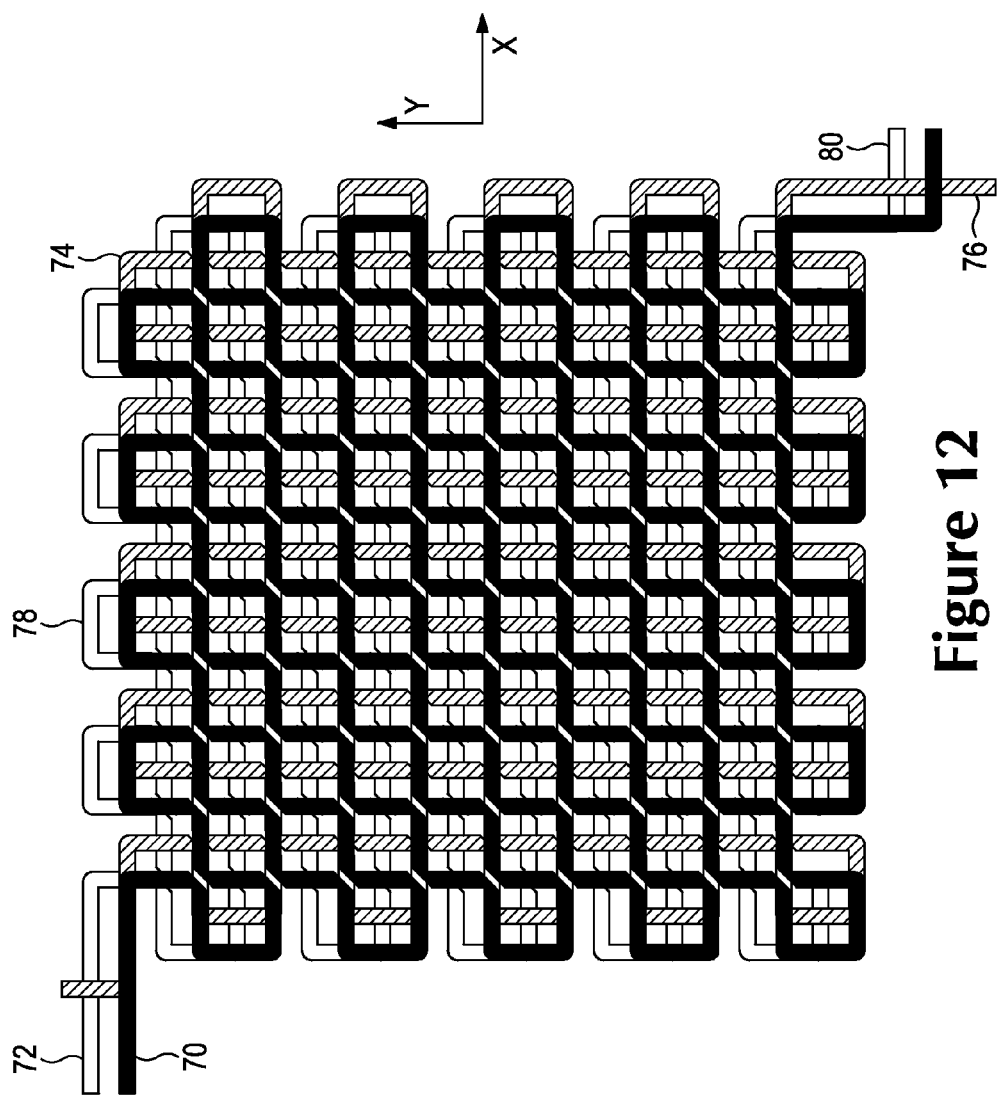

FIG. 12 shows the resulting pattern. The zig-zag line pattern 70 of FIG. 9 has been repeated in the second and third conductive layers but offset one half of the length of the side of the nominal squares formed by the zigzag traces. The pattern 74 for the second conductive layer, for example, has been offset one half the square length horizontally. The pattern 78 for the third conductive layer has been offset one half the square length vertically. The second and third conductive layers have their own connections, 76 and 80 respectively, that allow connection to a current source to energize the traces in the pattern.

Figure 14:
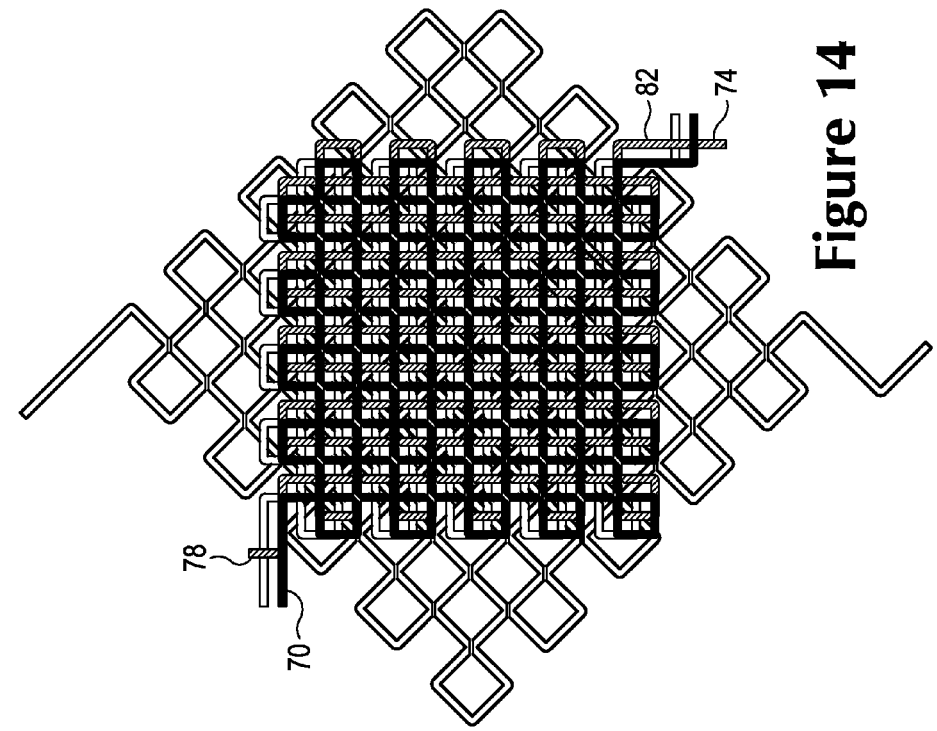
FIGS. 13 and 14 show an embodiment of a rotator trace pattern used to generate magnetic fields.
Figure 13:
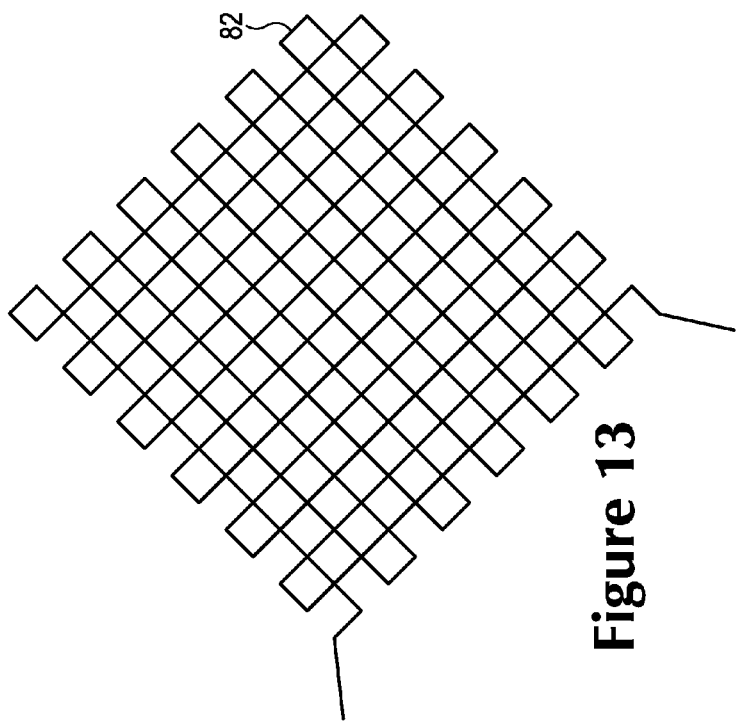

One may also expand the basic pattern of FIG. 9 and rotate it by 45 degrees to provide the capability of rotating the manipulators as they levitate. FIG. 13 shows an example of a rotator pattern 82. This pattern may reside in layer 4. FIG. 14 shows the combined layers and the resulting pattern of pattern 70 from the first layer, pattern 74 from the second layer, pattern 78 from the third layer and the rotator pattern 82 in the fourth layer.

In one embodiment, the rotator pattern 82 is aligned to the symmetric zig-zag line pattern 70 by making the rotator pattern 82 squares be $2^{0.5}=1.414$ times the size of the squares in the symmetric zig-zag line pattern. The rotator pattern 82 in this embodiment aligns the square corners of the rotator pattern 82 with the corners of the squares in every other diagonal in symmetric zig-zag line pattern 70. The aligned corners for rotator pattern 82 and symmetric zig-zag line pattern 70 can be used to rotate suitably designed magnet array manipulators in this embodiment. In particular, a manipulator using an array of 4 equal-size square magnets with canceling polarities, which would appear to have the north and south poles in a checkerboard fashion when viewed from above, can be rotated this way. In one embodiment each of the 4 magnets has dimensions 1 mm×1 mm×0.4 mm, using a pattern with square size L=1 mm (see FIG. 9). The rotation for this embodiment can be accomplished by driving a quadrature pattern of electrical currents described below using layer 1 and the rotator pattern on layer 4. In another embodiment the rotator pattern would reside under the XY via pattern discussed above to perform rotations. Typically, the rotator patterns combined with the above patterns will cause suitably designed manipulators at specific locations to rotate.

In another option multiple different trace patterns can be used. For example, circular and curved traces could be used as will be discussed in more detail below. FIGS. 15A-15D show a resulting circuit substrate, such as a printed circuit board, having a rectangular x-y pattern and a circular pattern.

In FIG. 15A in the x-y pattern 90, the first layer shown in FIG. 15A contains the parallel line pattern 91 having a known trace-to-trace distance with connections 92. The second layer shown in FIG. 15B contains the parallel line pattern 93 offset from layer 1 vertically by half the trace-to-trace distance of the first layer with connections 94. When these two patterns are laid on top of each other, the pattern 93 would appear just below pattern 91 in the gaps of pattern 91.

Figure 15D:
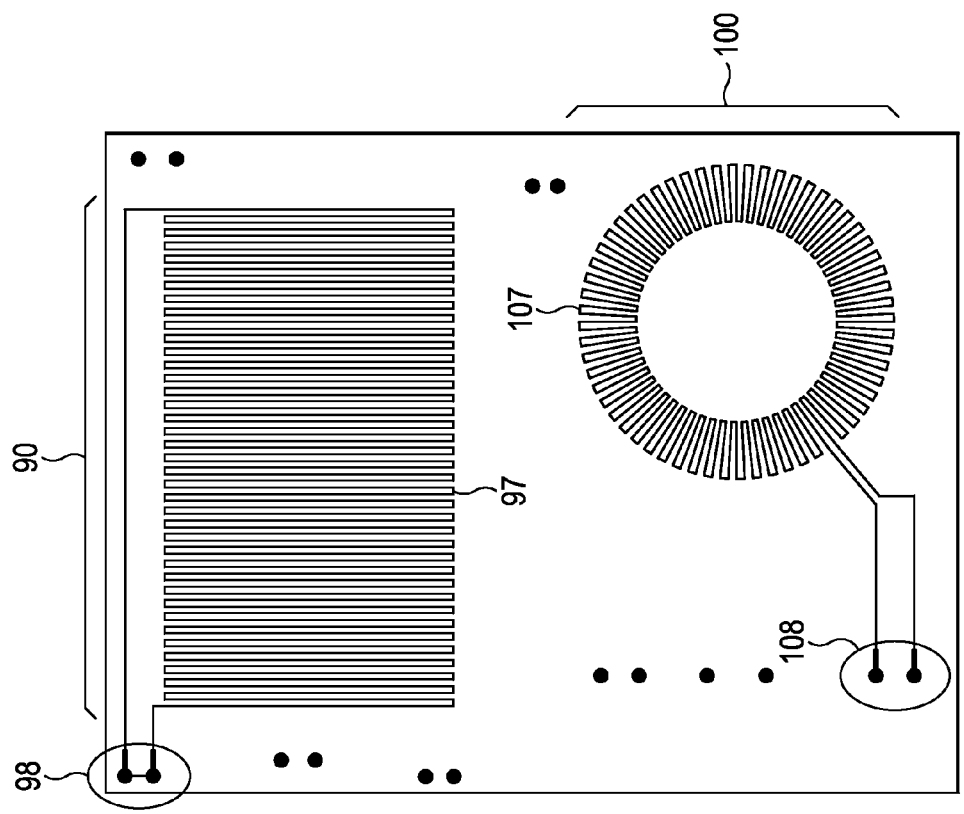
Figure 15C:
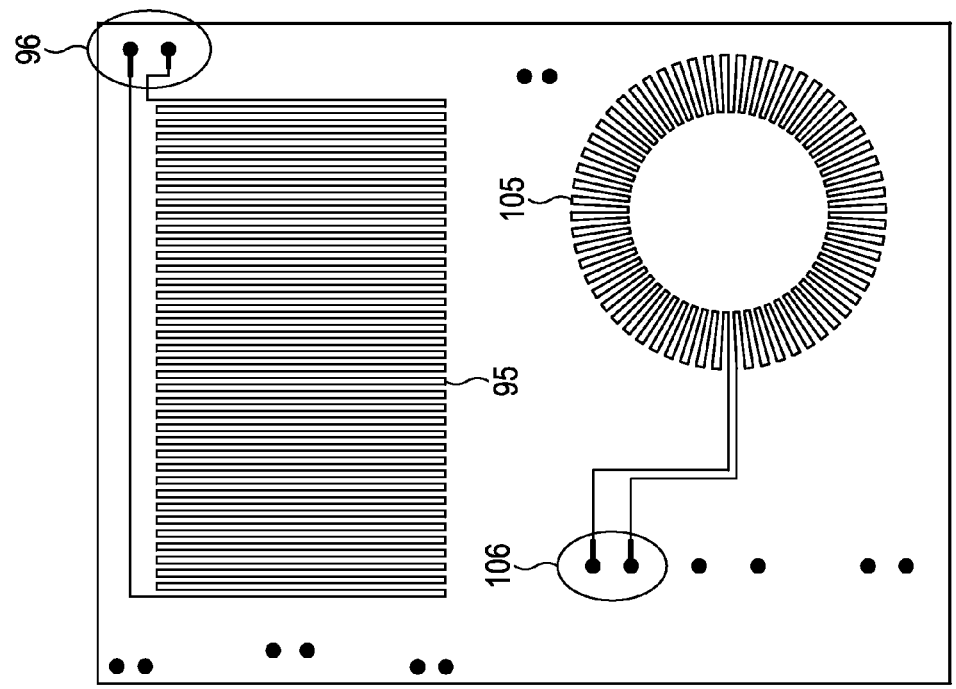

The third layer shown in FIG. 15C contains the parallel line pattern 95 rotated 90 degrees relative to the first layer pattern 91, the third layer having connections 96. The fourth layer contains the parallel line pattern 97 rotated 90 degrees relative to the first layer pattern, and offset horizontally half the trace distance from the third layer pattern with connections 98. When the third and fourth layers patterns are laid on top of each other, the pattern 97 would appear in the gaps of pattern 95, similar to that of the first two layers, but rotated 90 degrees.

Trace patterns can also have curvature. The circuit substrate of FIGS. 15A-15D has a circular pattern 100. The first layer pattern 101 has the same trace-to-trace distance as the parallel line patterns, but run in a circular pattern and has connections 102. The second layer pattern 103 overlaps the first layer pattern over 90 degrees of the circle. In this particular embodiment, the quarter of the circular pattern being overlapped from layer 1 lies in the upper left quadrant of the circle oriented on the page, near the second layer connections 104. If these two drawings were laid on top of each other, one would not be able to see the second layer pattern 103 separate from the first layer pattern 101.

The third layer pattern 105 of FIG. 15C does not follow the circular pattern of the first and second patterns; instead the pattern crosses the circles formed by the first layer in an in and out radial pattern, with connections 106. The spacing between the in and out traces is nominally the same spacing as the magnet size in one embodiment, though the curved nature of the pattern means the inner part has slightly narrower trace spacing than the outer trace spacing. The fourth layer pattern 107 with connections 108 of FIG. 15D follows the same pattern as the third layer but is rotated 1.5 degrees, in this embodiment, such that each radial line of the fourth layer passes midway between two radial lines of the third layer. In another embodiment, the fourth layer pattern is rotated such that its traces move approximately ½ magnet size along the circle relative to the corresponding third layer traces. Again, the spacing is nominal and actually varies slightly from inner part of the trace to the outer part. This circular pattern causes the manipulators to travel in a circle, similar to a racetrack. When layer 3 is laid on layer 4, the traces from layer 4 are visible in the gaps of layer 3.

The above discussion merely demonstrates that curved patterns on multiple layers are possible. Trace patterns may be in any type of pattern desired, including grids, parallel line patterns, square patterns, curved patterns or any combination thereof.

Figure 16:
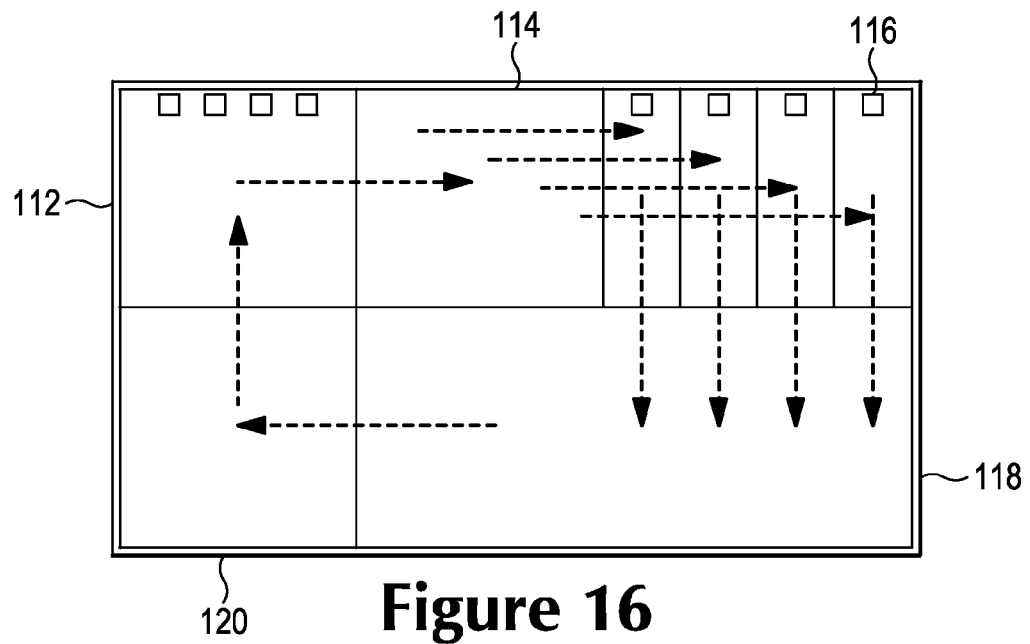
FIG. 16 shows an embodiment of a levitated microfactory.

Having seen the structures within the circuit substrate, the discussion now turns to how those structures are employed to move the manipulators. To provide context for the discussion, and with no intention to limit the microfactory to any particular configuration, FIG. 16 shows an 8-zone work surface that includes a liquid deposition and cleaning station 112, an input station 114, multiple output stations 116, a recirculating buffer zone 118 and a staging zone 120. The work surface may have multiple manipulators moving in unison, and sets of manipulators in alternate zones. The driving of the manipulators must be coordinated. The manipulators can use extensions, attached to the manipulators, with various end effectors (tools) known in the prior art. In some cases the end effectors can be simple sharp or blunt tips.

In the zigzag and parallel line traces, quadrature drive signals are used to create magnetic forces that propel the manipulator. The two traces are driven with a quadrature time-dependence of currents; the traveling wave will cause the manipulator to move perpendicular to the quadrature-driven traces of the parallel line pattern. For example, a parallel line pattern of two interleaved traces, discussed above such as traces 40 and 41 in FIG. 4, that vary spatially in the y-direction will move the manipulator in the x-direction. Using a notation in which (+, +) denotes a phase where each of the traces is driven with positive current, first layer and second layer or (L1, L2), (−, +) would denote that L1 is driving negative and L2 is driven positive and so forth. A quadrature drive to move perpendicular to the parallel line traces is then given as the time sequence of currents: (+, +), (−, +), (−,−) and (+,−). Reversing the sequence reverses the direction of motion and one can use microstepping to achieve intermediate locations between the discrete steps. Microstepping may be achieved using intermediate values. For example, to achieve a position between (+, +) and (−,+), one might drive the currents as (0, +), where the 0 represents the average current (zero) in Trace 1 between the two states.

Alternately, microstepping can be achieved using a high speed time sequence of states that average to the desired state, such as a high speed oscillation between states (+,+) and (−,+).

With this method of control, the currents must be switched faster than the manipulator can respond to individual sets of currents so that the manipulator's inertia effectively averages the high speed sequence. The manipulator can move in the perpendicular motion using the other sets of traces such as those in the third layer (L3) and the fourth layer (L4). When moving in the x-direction, one would typically hold the y traces with fixed current to prevent unwanted y motion during movement in the x-direction. Similarly, when moving in the y-direction, the current in the x traces would typically be held fixed. However, it is also possible to move in arbitrary diagonal directions using trace patterns such as shown in FIG. 6 by suitably driving quadrature currents in both x and y traces simultaneously. Although the description here discusses moving in the x and y direction using quadrature drive, the magnitude of the trace currents can also be used for control, such as by pulling part or all of a levitated manipulator closer to the surface of diamagnetic layer 14 using a higher current and hence stronger magnetic force.

Figure 17:
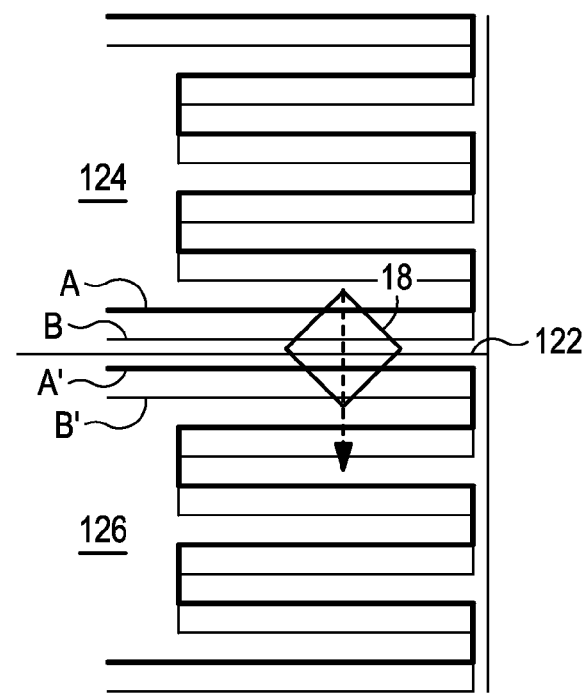
FIG. 17 shows an embodiment a manipulator traversing zones in a zigzag pattern.

FIG. 17 shows an example of the timing using quadrature drive signals in a parallel line pattern of traces that create magnetic forces that propel the manipulator 18 across a zone boundary 122. In this drawing, only one set of traces to move in the vertical or Y direction on the page are shown for clarity. The other set of traces, the X traces, can be driven similarly when X motion is desired. The quadrature traces A and B for zone 124, and the corresponding traces A' and B' for zone 126, are controlled independently. As manipulator 18 moves from zone 124 into zone 126, the trace A in zone 124 and trace A' in zone 126 are driven with the opposite currents from each other, with the same happening in the two B traces. In this manner, the magnetic patterned of peaks and troughs in the magnetic field formed by trace A in zone 124 can be locally extended into zone 126 with reverse current in trace A', and similarly for the magnetic patterns formed by traces B and B'.

Figure 18:
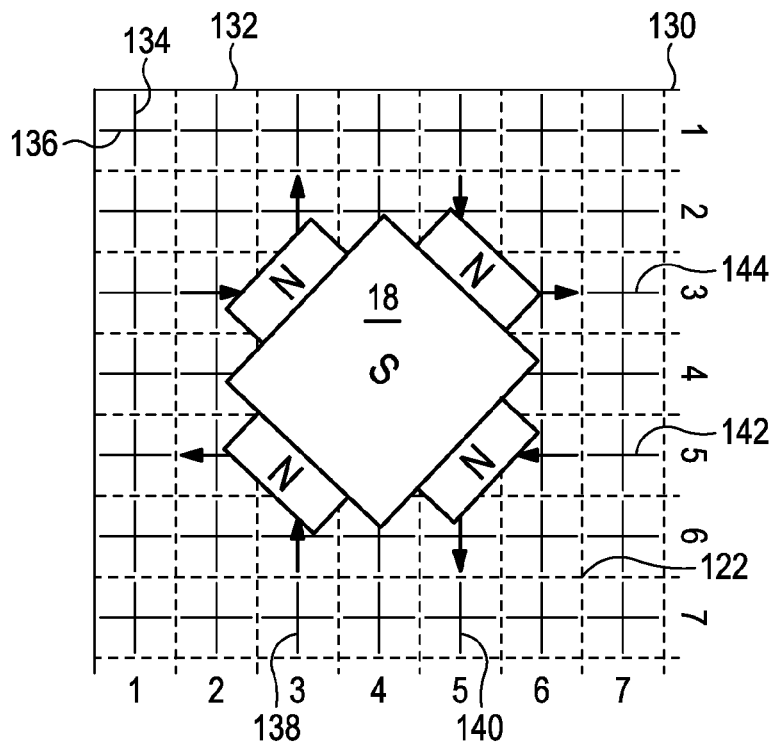
FIG. 18-19 show embodiments of boundaries and current flow in zones in a grid pattern.

FIG. 18 shows another example in which some or all of the work surface 130 is divided into smaller zones, such as 132, each with a horizontal drive trace oriented vertically such as 134 and a vertical drive trace such as 136 oriented horizontally. The different zones control segments of the drive traces, and can be connected to control electronics and a power source using, for example, vias that connect to the bottom of the circuit board. For ease of discussion, these zones will be numbered 1-7 horizontally and vertically. For example, the manipulator 18 in this example is holding at position (4, 4). Generally, a manipulator is held in a steady state position by having the current in the horizontal and vertical traces set up a preferred magnetic position of the local magnetic energy minimum of the manipulator 18 in the field generated by the currents. For example, with the manipulator 18 shown in FIG. 18 and letting (x,y) denote the x and y position of the center of the manipulator 18 and denoting the zone at location (a,b) by Z(a,b), running current from bottom to top as shown by arrow 138 through the zones Z(x−1, y)=Z(x−1,y−1)=Z(x−1,y+1)=Z(x−1,y−2)=Z(x−1, y+2) causes a force to the right of the grid. In the example of holding the manipulator at (4,4), the positive current will pass through (3,2), (3,3), (3,4), (3,5) and (3,6). A negative current is then run from top to bottom to create an equal force to the left of the grid, shown by arrow 140 through zones Z(x+1, y)=Z(x+1, y−1)=Z(x+1, y+1), Z(x+1, y−2)=Z (x+1, y+2), or one horizontal trace to the left of the holding point, starting two zones above and ending two zones below the holding point.

Similarly, current is run through the horizontally oriented, vertical control traces 142 and 144, with the positive current running from left to right in arrow 144, one vertical step up from the holding point. This causes a force to the bottom of the grid. Negative current then runs from right to left along trace 142, one vertical step down from the holding point, creating a force to the top of the grid. By setting currents in suitable zones in this way, the preferred magnetic position is determined. Manipulators with other magnetic geometries will have different sets of currents to set the preferred position.

Figure 19:
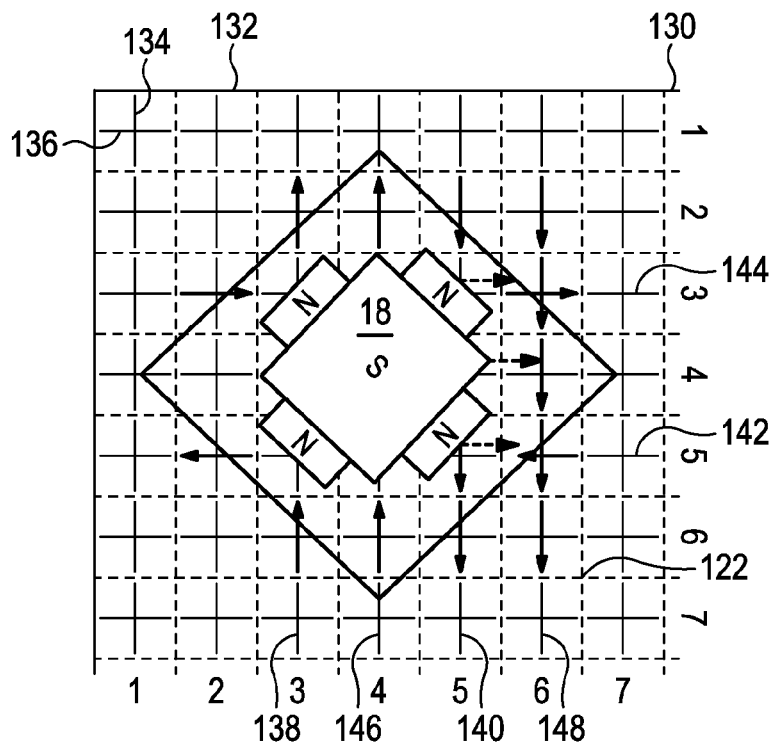

Using these principles, then, one can move the manipulator to an adjacent zone by controlling the current in adjacent traces as shown in FIG. 19. By setting the current in the vertically oriented, horizontal trace 146 at (4,6) through (4,2) to some positive level, the current at trace 138 at (3,2) through (3,6) to zero, the current in trace 140 at (5,2) to (5,6) to zero, and the current in trace 148 at (6,2) to (6,6) to the negative current of the current in trace 146, the manipulator would move over one zone from the position in FIG. 18. The current in trace 148 prevents the manipulator from advancing further. Traces 142 and 144 can keep the same currents they had in FIG. 18. Traces 142 and 144 do not move the manipulator in this case but they act as magnetic guides to keep the manipulator in the desired Y or vertical position on the page.

The manipulator could be moved to other adjacent zones in the horizontal or vertical directions, as well as diagonally by moving the manipulator horizontally and vertically together. Rotations can also be achieved by selectively driving zones and current segment so as to impart a torque on different parts of the manipulator.

In the grid traces, each of the traces in each zone is driven independently by a two-dimensional array of electronics below the traces. For each trace there could be four transistors to drive the current in the trace in both directions, such as the "H-bridge" configuration of 4 transistors known in the prior art as one way to arrange the transistors, with other circuit elements such as flip-flops to hold the state of the current. The act of setting current values for the grids of zones is similar to that of setting pixel values in a two-dimensional light-emitting diode display. The controller would send the current values to the electronics during each time cycle. Alternatively, the control would send only the values that change from one cycle to the next, and the electronics would modify the current values for the appropriate zones.

The designs shown here have either zigzag alternating traces, or the grid pattern having horizontal and vertical drive traces described as a parallel line pattern. Each design has its own advantages and disadvantages. The zigzag patterns require fewer connections and are simpler to control. One could tessellate the zigzag pattern in a manner similar to the parallel line pattern. This would allow the zigzag pattern to control as many manipulators as the grid layout. The zigzag pattern only requires one trace with current to hold the manipulator(s) in a fixed location, whereas the grid or parallel line pattern requires two traces (one x, one y) carrying current to hold a fixed location. The grid layout has much more flexibility and finer control but requires more signals and more connections.

The application of the current to the traces may be achieved in many different ways. FIG. 20 shows an example of a switch and driver circuit for the traces. A controller 160, mentioned previously, controls the timing and application of current to the traces as discussed above. The relay 162, such as a solid state relay, drives positive current to a particular trace and relay 164 drives the negative current. Each relay can be switched using an input current of 5-10 milliamps from controller 160 in this particular embodiment, and one terminal of the relay's output is connected to a positive or negative voltage supply. This example shows voltage supplies of 12 volts, but other voltages may be used depending upon the system configuration, materials and technologies used.

A resistor 166 may limit current as a safeguard in the situation where the potentiometer 168 may be incorrectly set. In the particular example of FIG. 20, with the voltages and current supplies, the total resistance should be approximately 10-40 ohms depending on the resistances of the traces the circuit is driving. The inductor 170 represents the trace itself on the circuit board, with ground 172 for the power supply. The resistor as well as other circuit elements for control may be included in the circuit substrate.

In operation, the system may use analog currents for optimal control. The discussion up to this point has focused on control being on the regions defined by the traces. However, the manipulators may move from one separate control region to another, traveling across regions of no control. This may be referred to as ballistic motion. The manipulator motion within one zone is built up and then 'flown' across a region of no control to another region of control. This motion may occur between zones on the same circuit substrate, or even from one circuit substrate to another, across a gap.

In other types of motion, one region may have the manipulators levitated, and another region may have the manipulators in contact with the surface. However, generally having the manipulators levitate will cause less wear and allow for more freedom of movement. The diamagnetic or current damping layer shown in FIG. 3 may be polished to allow the manipulators ease of movement. The surface of the layer should have a roughness less than a levitation distance of the manipulators. Non-levitated regions can be used to securely turn off power to the system without the manipulators levitating or floating to uncontrolled locations in the power off state. In another embodiment, the levitation surface can have shallow depressions to hold the manipulators in specified locations in the power off state. Since the manipulators can move freely throughout the system, a power shutdown routine can be used to move the manipulators to secure power off locations before the system's power to the traces is turned off.

Having seen the overall system for the manipulators to be moved and controlled, the discussion now turns to applications of these manipulators in various factory type settings. FIGS. 21-28 show various configurations to perform various processes in factory-like systems. In FIG. 21, the circuit substrate 12 has a controller 160 connected to control the current in the traces. The manipulator 18 has an end effector 182, essentially the working piece of the manipulator. This particular end effector has a probe or dip tip 184 upon which is a liquid 186. The liquid 186 may be a liquid to be deposited or may alter the surface adhesion energy of the tip 184 to allow it to pick up pieces and place them on the work object 190. The liquid may be picked up from the reservoir 180 and may act as an etchant, a depositable material, etc. By controlling the current in the traces, one can cause the manipulator to move to the reservoir 180 and pick up the liquid and then operate on the work object 190.

FIG. 22 shows an alternative configuration of the manipulator. In this situation, the work object 190 has too great a height for the manipulator to levitate above it. Instead, the end effector 182 in this embodiment has an extension length that allows the manipulator to work over the edge of the work object. The end effector can only reach a distance on the interior of the work object equal to the extension length.

Figure 23:
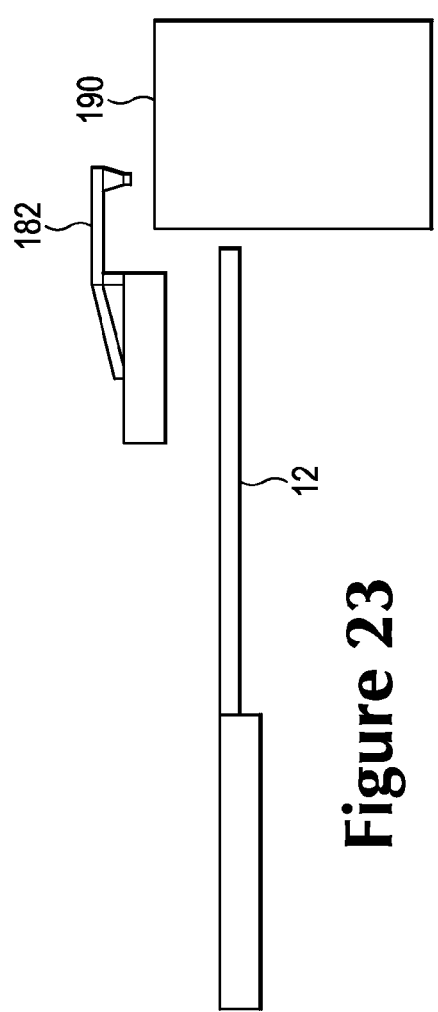

A similar limitation exists in the configurations where the work object 190 is beyond the floor of the system, shown in FIG. 23. The circuit substrate 12 is arranged adjacent the work object 190, and the manipulator can hover next to it with its extension arm 182. Again, the end effector can only reach a distance on the interior of the work object equal to the extension of the extension length.

Figure 24:
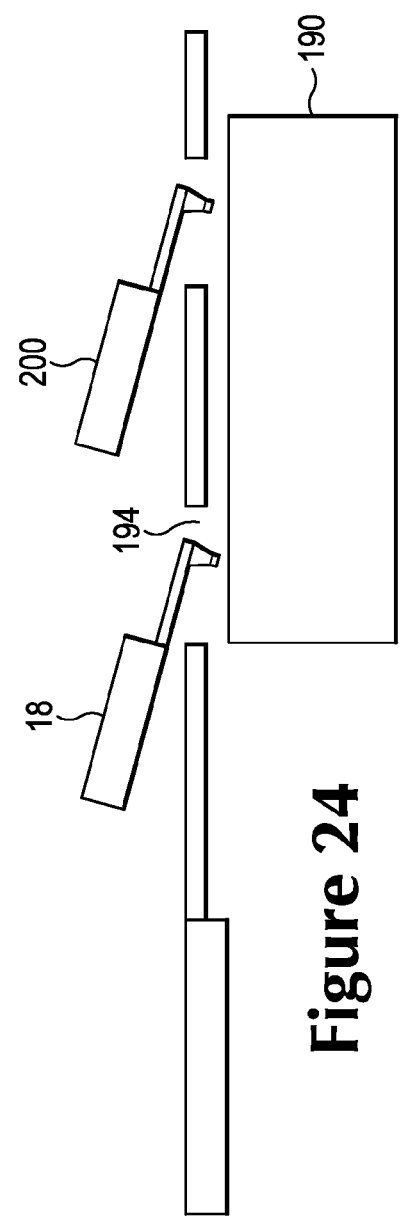

As discussed above many manipulators can operate simultaneously. In the configuration of FIG. 24, multiple manipulators 18 and 200 can work on the work object 190. The circuit substrate 12 has holes such as 194 which the manipulators can operate. The manipulator then pivot downs to the depth of the floor. In this and other embodiments, the manipulators can have different end effector extension to reach different parts of the work object 190.

In FIG. 25, the work object lies above the circuit substrate 12. It would be secured against gravity or reside on the underside of some other object. The end effector would be oriented to allow the manipulator to perform tasks above it. Similarly, in FIG. 26, the work object is to the side of the circuit substrate 12, on which the end effector could be performing pick and place on the work object 190, which may translate up and down from the circuit substrate to allow complete coverage.

In an alternative arrangement, shown in FIG. 27, the work object 190 could reside under the circuit substrate 12 which can provide a lifting force to the manipulator 18. The manipulator 18 would be levitated by the circuit substrate as a ceiling over the work object 190.

FIG. 28 shows an example of the manipulator going from one surface to another. The circuit substrate 12 levitates the manipulator 18 and moves it towards the second surface 210. As the manipulator nears the second circuit substrate 210, the control of the manipulator moves to the circuit substrate 210. The traces controlling manipulator 18 in circuit substrate 12 may be turned off to facilitate control transfer to circuit substrate 210. In one embodiment, high current pulses of 0.8 to 1.0 A are used in the traces of circuit substrate 210 to further facilitate control transfer. With the movement in the vertical direction, the manipulator will typically have to rest on the surface of the circuit substrate 210 in order to counteract gravity. This merely demonstrates the flexibility of the system and the ability to move manipulators around to perform tasks.

Figure 32:
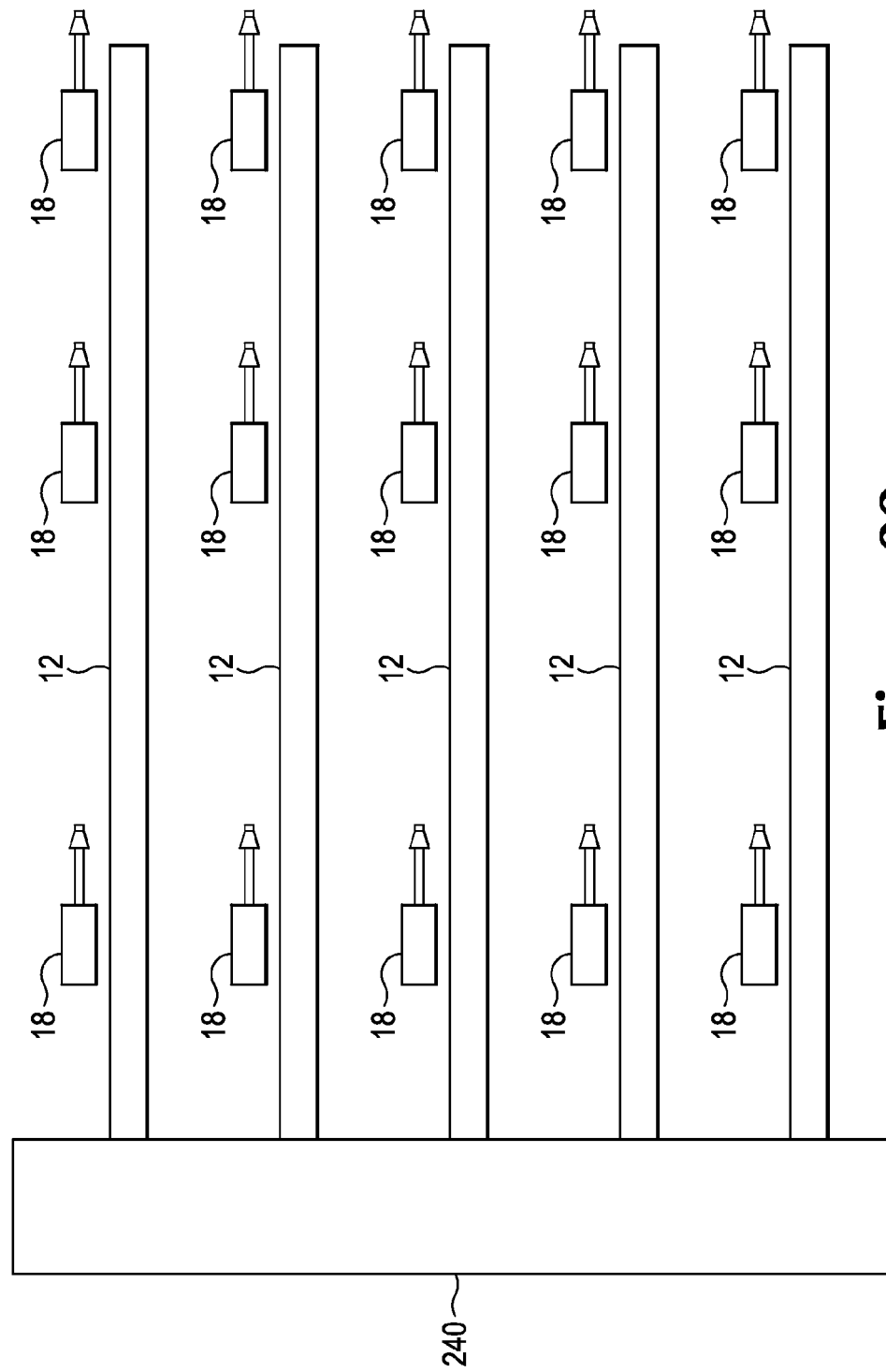
FIG. 32 shows an embodiment of a multiple substrate magnetic levitated manipulator system.
Figure 33:
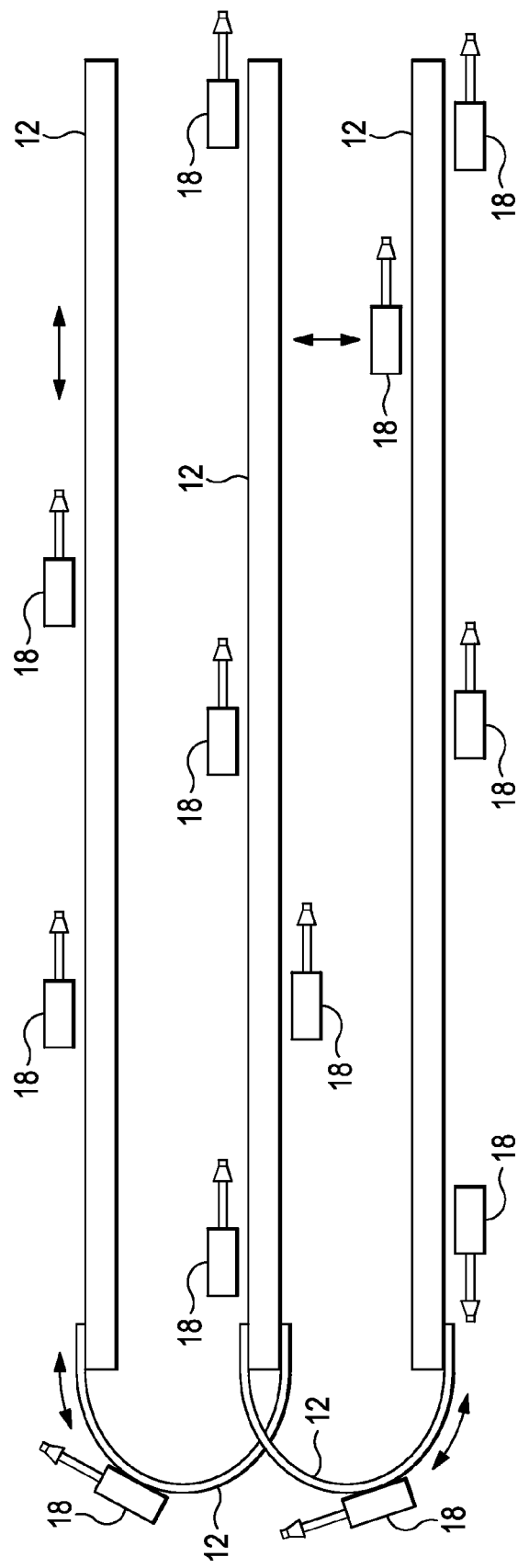
FIG. 33 shows an embodiment of a magnetic levitated manipulator system having flexible circuit substrates.

As indicated by FIG. 28, systems can consist of multiple circuit substrates 12 in various orientations. For example, the circuit substrate 12 may be duplicated many times in parallel to the one shown in FIG. 26 to allow manipulators to work on work object 190 at multiple points. In other cases multiple circuit substrates can be used to increase performance, such as placing a one circuit substrate 12 below manipulator 18 and a second circuit substrate close but above it. This would be analogous to the circuit substrate 12 shown above the manipulator 18 in FIG. 27 but with a circuit substrate below manipulator 18 rather than work object 190 below it. By driving manipulator 18 with two rather than one circuit substrate, peak force and peak speed of the manipulator 18 are increased. Three-dimensional arrays of circuit substrates can be configured as shown in FIG. 32, with manipulators 18 moving freely between the circuit substrates using methods such as shown in FIG. 28. The system may also use flexible circuits for circuit substrate 12 to make bent or curved paths, as shown in FIG. 33

In systems employing multiple circuit substrates 12, the multiple boards can be fixed or in some embodiments they may be replaceable to configure the system in different ways to achieve different desired functions. For example, the system may use a "motherboard" approach known in the prior art, with individual circuit substrates 12 plugged into the motherboard in a replaceable manner.

It will be appreciated from the above description that manipulators 18 can operate on circuits 12 in any orientation. Indeed, given sufficient current in the traces of circuits 12 the manipulators 18 can even operate while the orientation is actively changing, such as when circuit substrates 12 are in a portable hand-held device or when circuit substrates 12 are attached to a robot wrist which can change orientation. In one embodiment, via patterns such as those shown in FIGS. 26 and 28 were used with trace currents of 0.8 A in conductive layers 26 and 28 were used for a device that could be operated while its orientation was being changed by hand.

The tasks performed by the manipulators may depend in part upon the end effectors and their configurations. For example, the end effector 182 of FIGS. 21-28 used liquid either as a deposited material, an etchant or as an adhesive to attach material or other pieces to the end effector. FIG. 29 shows a 'fork' or "shovel" type end effector useful to move materials around in multiple directions allowing transportation of materials across the work surface. FIG. 30 shows a "pusher" end effector that allows the material to be pushed in one direction. In one example, the shovel end effector on the end of one manipulator may place the material in front of the broom end effector of another manipulator, allowing the broom end effector to push the material up against a work object.

As noted above, with suitable programming, manipulators can be translated and rotated to translate and rotate their attached end effectors to perform various desired tasks. To tilt about an axis parallel to the plane of diamagnetic layer 14, for example, the trace currents can be driven to repel the magnets in one part of manipulator 18 while attracting other magnets in other parts of manipulator 18. Manipulator 18 can thus be made to rotate or tilt about an axis parallel to diamagnetic layer 14, where "yaw" is defined as a rotation about an axis perpendicular to the local plane of circuit substrate 12, and "roll" and "pitch" would be tilt directions of rotation. Even simpler control strategies may be used for tilt in many cases using the added mass of the end effector in conjunction with gravity.

FIGS. 31A-B show a simple example analogous to the configuration shown in FIG. 23. Manipulator 18 with end effector 182 moving on circuit substrate 12 approaches work object 190 in a powered-on state in FIG. 31A. To tilt the end effector 182 down to touch work object 190, power is turned off. In this embodiment, end effector 182 has enough mass relative to manipulator 18 that gravity will tilt the manipulator 18 and its rigidly attached end effector 182 into a "tilt-down" state by rotating around the tilt axis 230 extending into the page shown in FIG. 31B. Tilt axis 230 would generally coincide with at least two points on manipulator 18 to define an axis of rotation. A single point on manipulator 18 can also be used in some cases but, depending on the mass distribution, a single point may cause some component of rotation about an axis perpendicular rather than parallel to the diamagnetic layer 14.

To tilt up, power is applied to circuit substrate 12 and the magnetic forces are sufficient to re-orient manipulator 18 and end effector 182 back to the "tilt-up" state. Mass can be added or subtracted from the structure of end effector 182 to achieve reliable tilt-down and tilt-up states relative to the available magnetic forces from circuit substrate 12. With proper mass balancing on a low friction diamagnetic layer 14, the manipulator 18 can even be made to translate parallel to the plane of circuit substrate in a low-current mode, with a high-current mode being used for tilt-up operations. In one embodiment, the low-current mode was 0.25 A, 0.33 A, 0.5 A, and 0.7 A for conductive layers 26, 28, 30, and 32 in circuit substrate 12 (see FIG. 3) and the high current mode used 0.8 A, 0.8 A, 0.5 A, and 0.7 A for the high-current mode for conductive layers 26, 28, 30, and 32 respectively.

In this manner, a microfactory system can be provided that allows multiple manipulators to be controlled on the surface of a circuit substrate. The circuit substrate can be manufactured according to standard manufacturing techniques. The controller provides precise control of the manipulators to perform tasks on a work object.

FIG. 34 shows one embodiment of such a system may include a first substrate 200 and a flex circuit 210 connected to the first substrate. The connection can be as simple as tape or adhesives. An important aspect of the connection is that the flex circuit 210 be parallel to the first substrate 200 in the connection region, and the flex edge does not present too big a step or discontinuity. The first circuit 200 may be referred to as an 'operation' substrate. The operation substrate may consist of a rigid printed circuit board, a flex circuit, etc. The term 'operation' merely differentiates the first substrate from a connecting substrate, no limitation or requirement of operations having to be performed on this substrate is intended nor should it be supplied. The operation substrate 200 may include a conductive traces such as 204 within the bottom surface 206 and top surface 202. One or both of these surfaces form the sliding surfaces, which may or may not be diamagnetic. As stated above, the term operation substrate does not preclude the flex circuit 210 from having operations occur on it as well.

The flex circuit component 210 in the system will typically form a path or paths for the manipulators, either between operation substrates or from one point to another on the operation substrate, or to allow the manipulator to change orientation. As stated above, the operation substrate may consist of a flex circuit as well. The flex circuit 210 has at least one conductive trace 214 with a bottom surface 216 and a top surface 212, either or both of which may be sliding surfaces. Again, these surfaces may or may not be diamagnetic.

Generally, flex circuits, meaning a flexible substrate such as a polymer tape or other flexible medium having conductive traces. In the case of the magnetic manipulators, at least one surface may be diamagnetic or it can be a simple sliding surface that is not necessarily diamagnetic. In one embodiment, the surface may be made of adhesive backed, 1 mil thick graphite. The conductive traces may reside in an inner layer of the flex circuit, and the diamagnetic or sliding surface will typically be an outer layer of the flex circuit. However, the diamagnetic surface may also have an anti-friction coating upon it. The manipulator will be referred to as being 'on' the diamagnetic surface even if it actually resides on the anti-friction coating.

Flex circuits have some advantages as manipulator drives with regard to power and heating. Generally, flex circuits use thinner copper layers than rigid PCBs to maintain flexibility. Thinner copper traces have higher resistance and higher power per amp of current for the same width and length trace, and the drive force is linear with the current. One might expect flex circuits to perform poorly in terms of force per unit power. However, flex circuits may actually have higher force per unit power in some geometries, and in most cases have at least comparable force per unit power compared to rigid PCBs. This is because the thinner traces and insulation in a flex circuit allows the current in a multi-layer stack to be closer to the magnets on the manipulator. The force generated between a trace and a magnet is very sensitive to the distance, and this factor can more than compensate for the higher resistance in the traces.

The system includes at least one manipulator. The operation substrate and the flex substrate both include a diamagnetic layer, typically at least one surface, and at least one conductive trace in the substrate, as previously discussed. Although we will describe it as a diamagnetic layer and this is the preferred embodiment, it is to be understood to include embodiments where the layer is a simple sliding layer and may or may not be diamagnetic. The controller selectively applies current to the conductive traces to generate magnetic fields to move the manipulator around the flex circuit relative to the operation substrate, between operation substrates or between operation substrates and other objects, etc.

FIG. 35 shows an embodiment of a system having an operation substrate 200 and a flex circuit 210. The term 'magnetically coupled' as used here means that the flex circuit and the operation substrate are near enough to each other that a manipulator such as 218 can magnetically move from one to the other using the magnetic fields generated by current applied to the conductive traces in the substrate and the flex circuit.

The operation substrate will typically have at least one conductive trace 204 within it. The operation substrate will also have at least one diamagnetic surface such as 202. The opposite surface 206 may also be diamagnetic or a sliding surface, allowing the manipulator to move on either surface. The flex circuit will generally have similar characteristics, with a diamagnetic surface such as 212 or 216, and at least one conductive trace such as 214 as shown in FIG. 34.

One embodiment of the system includes at least one additional operation circuit such as 220. Unlike the embodiment of FIG. 33, in which a manipulator can only move from the top of one operation substrate to the bottom of the other, or from a bottom of one to the top of the other, the flex circuit 210 includes at least one bend or twist oriented about more than one axis of curvature. This allows the manipulator such as 218 to travel on the top of the flex circuit until reaching the twist and then emerges at the position shown to move onto the top 222 of the second operation substrate 220. Similarly, manipulator 219 can move from bottom to bottom.

The additional operation substrate or substrates do not have to reside in a three-dimensional array as shown in FIGS. 33 and 35. They may be oriented in any manner relative to the first operation substrate that allows the manipulator to traverse between them across the flex circuits. Similarly, the additional operation substrate is also optional. The use of a flex circuit with just one operation may provide options for the configuration of a microfactory on the operation substrate that would not be otherwise available.

Figure 36:
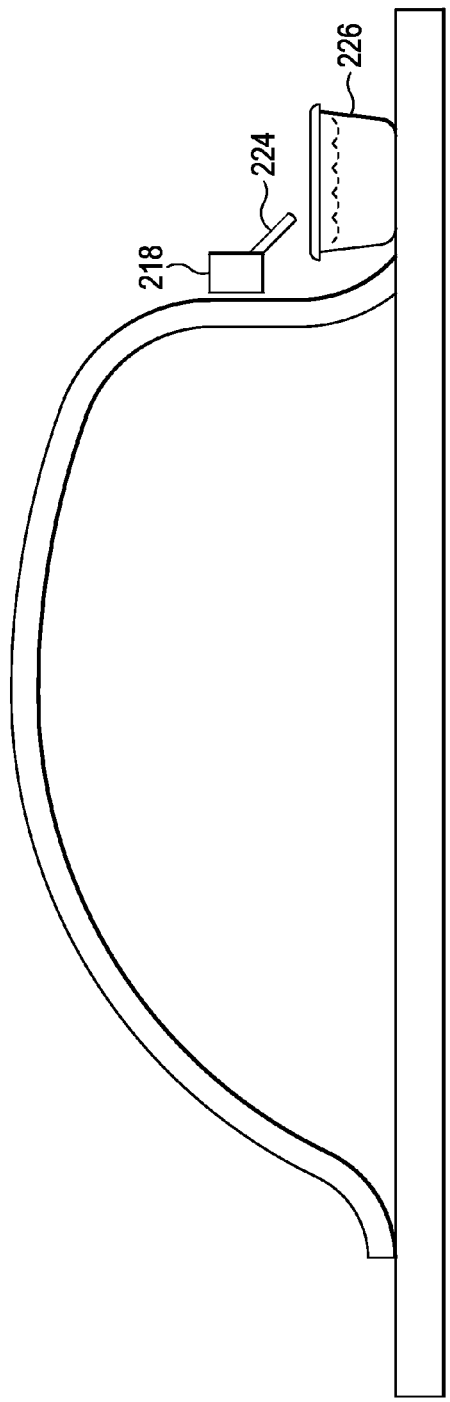
FIGS. 36 and 37 show embodiments of a system in which a flex circuit forms a path out of a plane of an operation circuit to access building objects.

As shown in FIG. 36, for example, having a path for the manipulators that is out of the plane of the operation substrate allows for changes in orientation and may provide solutions for other issues in manufacture. In some of the above embodiments, the end effector of the manipulator was inserted into a liquid. In order for the end effector to access the liquid, but to avoid having the liquid leak out of the reservoir, the liquid must feed out of the reservoir through a small opening or a sufficiently small enough tube such that the surface tension contains the liquid. Cleaning agents in particular present problems as they typically have low surface tension.

In FIG. 36, however, one can see that by creating a path out of the plane of the operation substrate, the manipulator 218 with a dip stick type of end effector 224 can approach the reservoir from above, allowing the simple force of gravity to contain the liquid and reducing the constraints on the types of liquids usable in this environment. In this embodiment, the building object retrieved is liquid. Other types of building objects may be acquired in a similar fashion.

Figure 37:
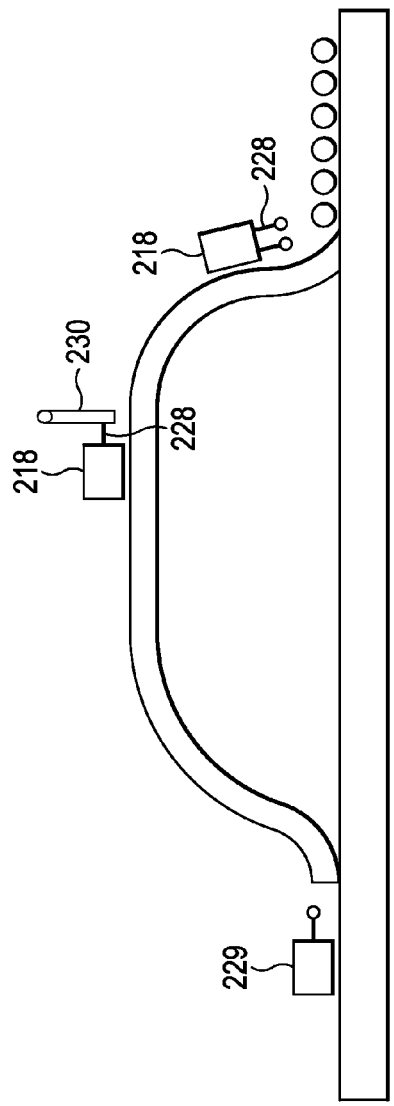
Figure 38:
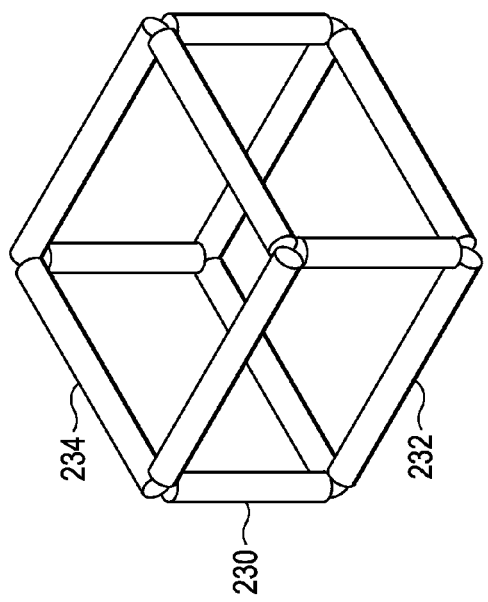
FIG. 38 shows an example of a structure having building objects of different orientations.

FIG. 37 shows an alternative embodiment in which the manipulator can approach the building object, in this case carbon rods, in a manner to allow the end effector to pick up the rod in a particular orientation. The end effectors on some of these manipulators may not be able alter the orientation of a building object once it has been picked up. Depending upon the structure being built, rods may need to have several different orientations. FIG. 38 shows a cubic lattice of rods. This lattice has rods of three different orientations. Rod 232 has a horizontal orientation relative to the page, rod 230 has a vertical orientation and rod 234 has an oblique orientation. The manipulators typically must retrieve the rod in the desired orientation for the site into which the rod will be placed, it cannot adjust the orientation after picking it up.

Returning to FIG. 37, it also illustrates that the manipulator 218, with its end effector 228 can pick up the rod in a vertical orientation and then transport it in that orientation to a second manipulator 219. The manipulator 219 receives the rod and maintains its orientation from the feeding manipulator 218. Manipulator 219 can receive the rod from manipulator 218 in various ways. If both manipulators use wetted end effectors to grab and hold the rod with surface tension, for example, Manipulator 219 can have wetted end effectors that push the rod off the wetted end effector of Manipulator 218. In another alternative, another manipulator could feed the rods to the manipulator 218.

In addition to the ability to approach a pick up station in a different orientation, the pick up station could be a catch basin. The flex circuit in FIG. 36, for example, could be testing station for manipulators. If the manipulator traverses the flex circuit towards the basin 226 and cannot make the reverse climb, it would instead fall off the flex circuit into the basin 226, which would not contain liquid. This would allow for quality control of the manipulator to identify those without sufficient magnetic attraction to the flex circuit.

FIGS. 36 and 37 demonstrate the use of a flex circuit within the realm of one operation substrate. However, they also demonstrate the configurability and flexibility of a modular microfactory system. For example, if one were building a three-dimensional structure on another surface, one could connect several of the operation substrates having the same layout together and they would enable a swarm of manipulators to replicate the same task on the building site, like a termite swarm building a mound. Alternatively, one could connect several differently configured operation substrates together to perform several diverse functions in concert. These could also be combined together with several operation substrates of similar layouts connected to several operational substrates with different layouts together.

Figure 39:
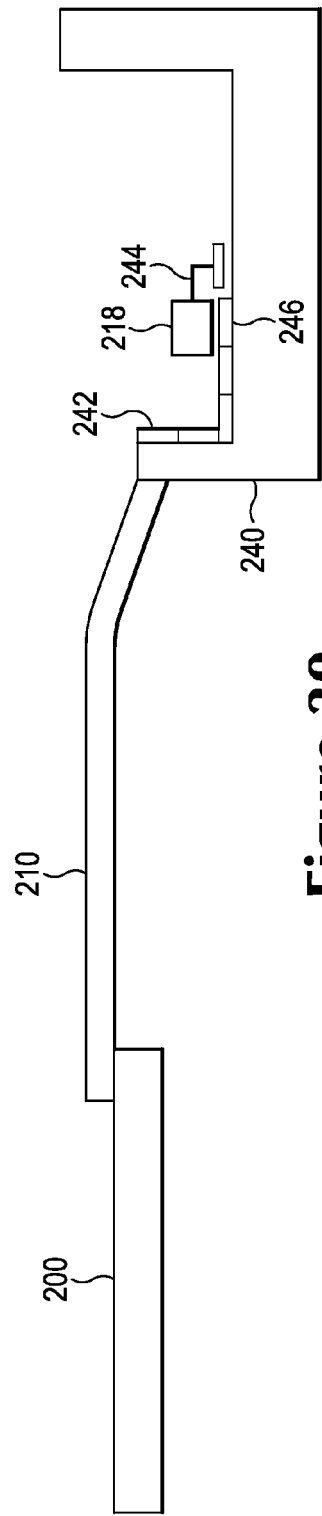
FIG. 39 shows an embodiment of a system connected to an object.

In addition to connecting substrates together, the flex circuit could connect the operation substrates to other objects, much like a computer connects to a printer or other peripheral device. The connection may be to an object under construction or to an object that may need to be monitored and possibly repaired. The object may have embedded traces that allow the manipulators to move around on it. FIG. 39 shows an example of an operation substrate 200 connected through a flex circuit 210 to an object 240. The object 240 may have embedded circuit traces such as 242 that allow the manipulator to traverse the object.

In this manner, the system of an operation substrate and a flex circuit can adapt and adjust to multiple different manufacturing needs. They offer high degrees of flexibility and configurability as well as allowing changes in orientation and simplification of manufacturing processes and materials.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system, comprising:
   a first operation substrate, the operation substrate having at least one sliding surface and at least one conductive trace in a layer in the substrate;
   at least one flex circuit magnetically coupled to the operation substrate, the flex circuit having at least one sliding surface and at least one conductive trace in the substrate; and
   at least one manipulator moveable across the sliding surfaces of the operation substrate and the flex circuit by magnetic fields generated by application of current to the conductive traces.

2. The system of claim 1, further comprising at least one additional operation substrate magnetically coupled to the first operation substrate through the flex circuit.

3. The system of claim 2, wherein the additional operation substrate has a same layout of the first operation substrate to allow the manipulator to perform more of a same task.

4. The system of claim 2, wherein the additional operation substrate has a different layout than the first operation substrate to allow the manipulator to perform a different task in addition to a task performed on the first operation substrate.

5. The system of claim 2, wherein the flex circuit has at least one twist about at least one axis of curvature to form a path for the manipulator to move from a top of the first operation substrate to a top of the additional operation substrate.

6. The system of claim 5, wherein the path also traverses from a bottom of the first operation substrate to a bottom of the additional operation substrate.

7. The system of claim 2, wherein the flex circuit connects only to the first operation substrate.

8. The system of claim 7, wherein the flex circuit forms a path for the manipulator out of the plane of the operation substrate.

9. The system of claim 8, further comprising a pick up station adjacent the path.

10. The system of claim 9, wherein the pick up station comprises a liquid pick up station or a building object pick up station.

11. The system of claim 1, wherein the operation substrate is a flexible substrate.

12. The system of claim 1, further comprising an object connected to the flex circuit.

13. The system of claim 12, wherein the flex circuit is a portion of the operation substrate.

14. The system of claim 12, wherein the object further comprises an object having a diamagnetic layer and conductive traces.

15. The system of claim 1, wherein the object comprises an object to be operated on by the manipulator.

16. The system of claim 1, wherein the sliding surface is diamagnetic.

17. A method of constructing an object comprising:
   picking up a building object with a manipulator residing on a sliding surface of one of a flex circuit or a operation substrate,
   selectively activating traces in one of the flex circuit or operation substrate to generate magnetic fields to move the manipulator across one or both of the sliding surfaces to a building site;
   controlling the manipulator with the magnetic fields to deposit the building object at the building site.

18. A method of constructing an object comprising:
   picking up a building object comprising:
      moving a first manipulator along a flexible circuit substrate having a first orientation,
      picking up the building object with the first manipulator, the building object having an orientation resulting from the first orientation of the manipulator,
      transporting the building object to a second manipulator, and
      using the second manipulator to pick up the building object from the first manipulator to preserve the orientation;
   selectively activating traces to move the manipulator to a building site; and
   controlling the manipulator to deposit the building object at the building site.

19. A method of constructing an object comprising:
   picking up a building object comprising:
      moving a first manipulator along a flexible circuit substrate that resides above a first operation substrate,
      approaching a liquid reservoir on the operation substrate from above the reservoir, and
      picking up liquid from the liquid reservoir using an end effector on the manipulator;
   selectively activating traces to move the manipulator to a building site; and
   controlling the manipulator to deposit the building object at the building site.

* * * * *